(12) United States Patent
Gerdes et al.

(10) Patent No.: US 10,219,179 B2
(45) Date of Patent: Feb. 26, 2019

(54) TRANSPOSITIONAL MODULATION COMMUNICATIONS BETWEEN DEVICES

(71) Applicant: TM IP Holdings, LLC, Tucson, AZ (US)

(72) Inventors: Richard C. Gerdes, Tucson, AZ (US); Daniel L. Hodges, Tucson, AZ (US); Quinn Colin McIntosh, Tucson, AZ (US)

(73) Assignee: TM IP Holdings, LLC, Tucson, AZ (US)

( * ) Notice: Subject to any disclaimer, the term of this patent is extended or adjusted under 35 U.S.C. 154(b) by 0 days.

(21) Appl. No.: 15/864,331

(22) Filed: Jan. 8, 2018

(65) Prior Publication Data

US 2018/0152863 A1 May 31, 2018

Related U.S. Application Data

(63) Continuation of application No. 15/293,910, filed on Oct. 14, 2016, now Pat. No. 9,867,086, which is a continuation of application No. 15/139,213, filed on Apr. 26, 2016, now Pat. No. 9,473,983.

(51) Int. Cl.

| *H04W 28/10* | (2009.01) |
| *H04L 27/32* | (2006.01) |
| *H04W 76/14* | (2018.01) |
| *H04L 27/00* | (2006.01) |

(52) U.S. Cl.
CPC ............ *H04W 28/10* (2013.01); *H04L 27/00* (2013.01); *H04L 27/32* (2013.01); *H04W 76/14* (2018.02)

(58) Field of Classification Search
CPC ..... H03L 7/0896; H03L 7/087; H03L 7/0891; H03L 2207/06; H03L 7/091; H03L 7/113; H03L 7/097; H04L 27/32; H04L 27/00; H04L 27/34; H04L 7/0331; H04L 7/0337; H04L 27/127; H04L 2027/0051;
(Continued)

(56) References Cited

U.S. PATENT DOCUMENTS

| 3,944,928 A | 3/1976 | Augenblick et al. |
| 3,968,486 A | 7/1976 | Gerdes |
| 4,259,888 A | 4/1981 | Gross |

(Continued)

FOREIGN PATENT DOCUMENTS

| TW | 201740713 | 11/2017 |
| WO | WO2014143046 A1 | 9/2014 |

(Continued)

OTHER PUBLICATIONS

International Search Report and Written Opinion for International Application No. PCT/US2017/028940, dated Jul. 20, 2017, 6 pages.

*Primary Examiner* — Khanh C Tran
(74) *Attorney, Agent, or Firm* — Fish & Richardson P.C.

(57) ABSTRACT

Methods, systems, and apparatus, including computer programs encoded on a computer storage medium, for determining, by a first device, that a second device is within range for direct communications and that the second device is capable of performing transpositional modulation (TM) communications. Determining to use transpositional modulation to send data to the second device. Sending the data to the second device using a TM signal.

18 Claims, 14 Drawing Sheets

(58) Field of Classification Search
CPC ....... H04L 27/122; H04L 27/12; H04L 27/14; H03C 7/02
See application file for complete search history.

(56) References Cited

U.S. PATENT DOCUMENTS

| | | | |
|---|---|---|---|
| 4,301,415 A | | 11/1981 | McFayden |
| 4,308,503 A | * | 12/1981 | Scott .................. H04L 27/2275 329/308 |
| 4,318,055 A | | 3/1982 | Hopwood et al. |
| 4,342,245 A | | 8/1982 | Gross |
| 4,613,974 A | | 9/1986 | Vokac et al. |
| 4,680,633 A | | 7/1987 | Gerdes et al. |
| 4,803,705 A | * | 2/1989 | Gillingham .......... H03L 7/0891 331/1 A |
| 4,989,219 A | | 1/1991 | Gerdes et al. |
| 5,021,786 A | | 6/1991 | Gerdes |
| 5,124,706 A | | 6/1992 | Gerdes |
| 5,155,672 A | | 10/1992 | Brown |
| 5,165,017 A | | 11/1992 | Eddington et al. |
| 5,184,218 A | | 2/1993 | Gerdes |
| 5,200,715 A | | 4/1993 | Gerdes et al. |
| 5,200,822 A | | 4/1993 | Bronfin et al. |
| 5,327,237 A | | 7/1994 | Gerdes et al. |
| 5,511,100 A | | 4/1996 | Lundberg et al. |
| 5,557,333 A | | 9/1996 | Jungo et al. |
| 6,052,410 A | * | 4/2000 | Okita .................. H04L 27/00 375/222 |
| 6,522,697 B1 | | 2/2003 | Spickermann |
| 6,559,757 B1 | | 5/2003 | Deller et al. |
| 6,788,154 B2 | * | 9/2004 | Maneatis ................ G05F 3/262 327/156 |
| 7,856,050 B1 | | 12/2010 | Wiss et al. |
| 8,537,952 B1 | * | 9/2013 | Arora ................... H03C 3/0925 375/354 |
| 9,014,293 B2 | | 4/2015 | Gerdes |
| 9,369,912 B2 | * | 6/2016 | Stojanovski ............ H04W 4/70 |
| 9,473,983 B1 | | 10/2016 | Gerdes et al. |
| 9,867,086 B2 | | 1/2018 | Gerdes et al. |
| 2003/0071684 A1 | | 4/2003 | Noori |
| 2004/0247041 A1 | | 12/2004 | Biedka et al. |
| 2004/0252531 A1 | | 12/2004 | Cheng et al. |
| 2005/0065901 A1 | | 3/2005 | Diong |
| 2005/0200391 A1 | | 9/2005 | Steinbach et al. |
| 2006/0006914 A1 | | 1/2006 | Fan-Jiang |
| 2006/0197564 A1 | | 9/2006 | Yen |
| 2007/0041485 A1 | * | 2/2007 | Chang .................... H03L 7/087 375/376 |
| 2011/0043039 A1 | | 2/2011 | Mancebo del Castillo Pagola |
| 2011/0051780 A1 | * | 3/2011 | Kawasaki ................ H04B 1/40 375/135 |
| 2012/0171963 A1 | | 7/2012 | Tsfaty |
| 2014/0036769 A1 | * | 2/2014 | Stojanovski ............ H04W 4/70 370/328 |
| 2014/0192737 A1 | * | 7/2014 | Belghoul .............. H04W 4/008 370/329 |
| 2015/0023456 A1 | | 1/2015 | Vann et al. |
| 2017/0311205 A1 | | 10/2017 | Gerdes et al. |

FOREIGN PATENT DOCUMENTS

| | | |
|---|---|---|
| WO | WO2014145868 A1 | 9/2014 |
| WO | WO2017189365 A1 | 11/2017 |

* cited by examiner

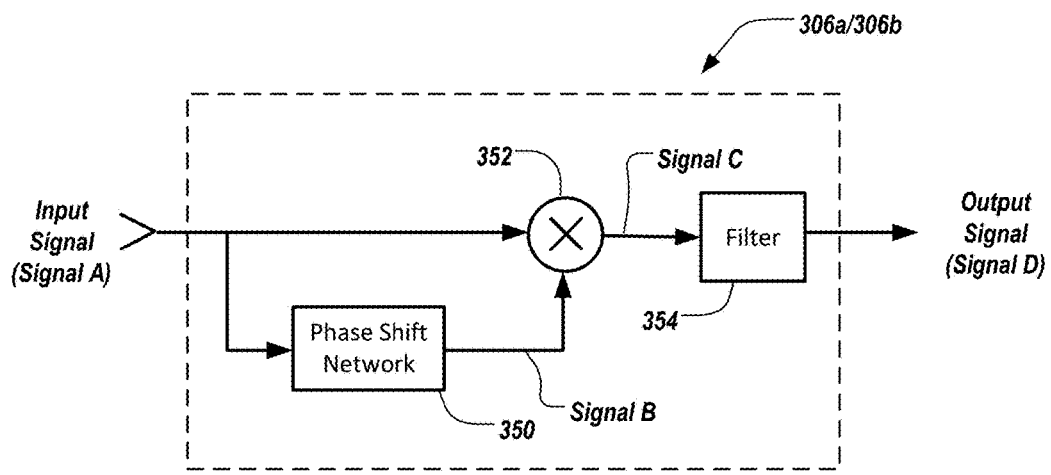
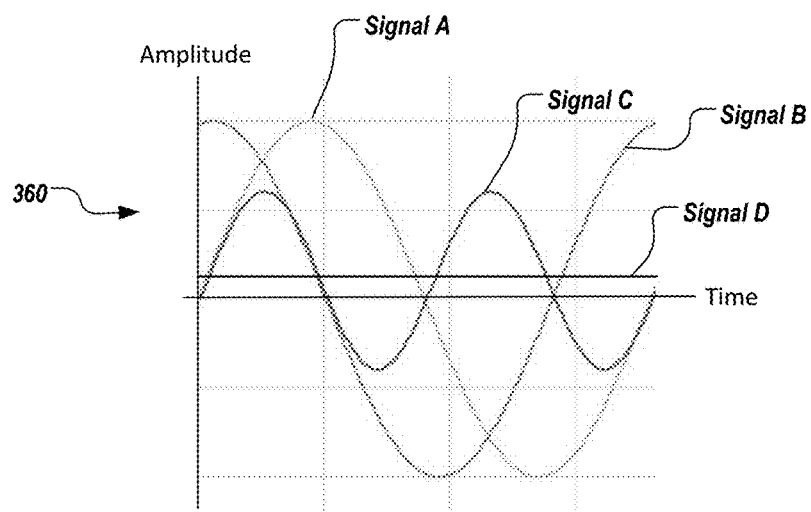
FIG. 3B

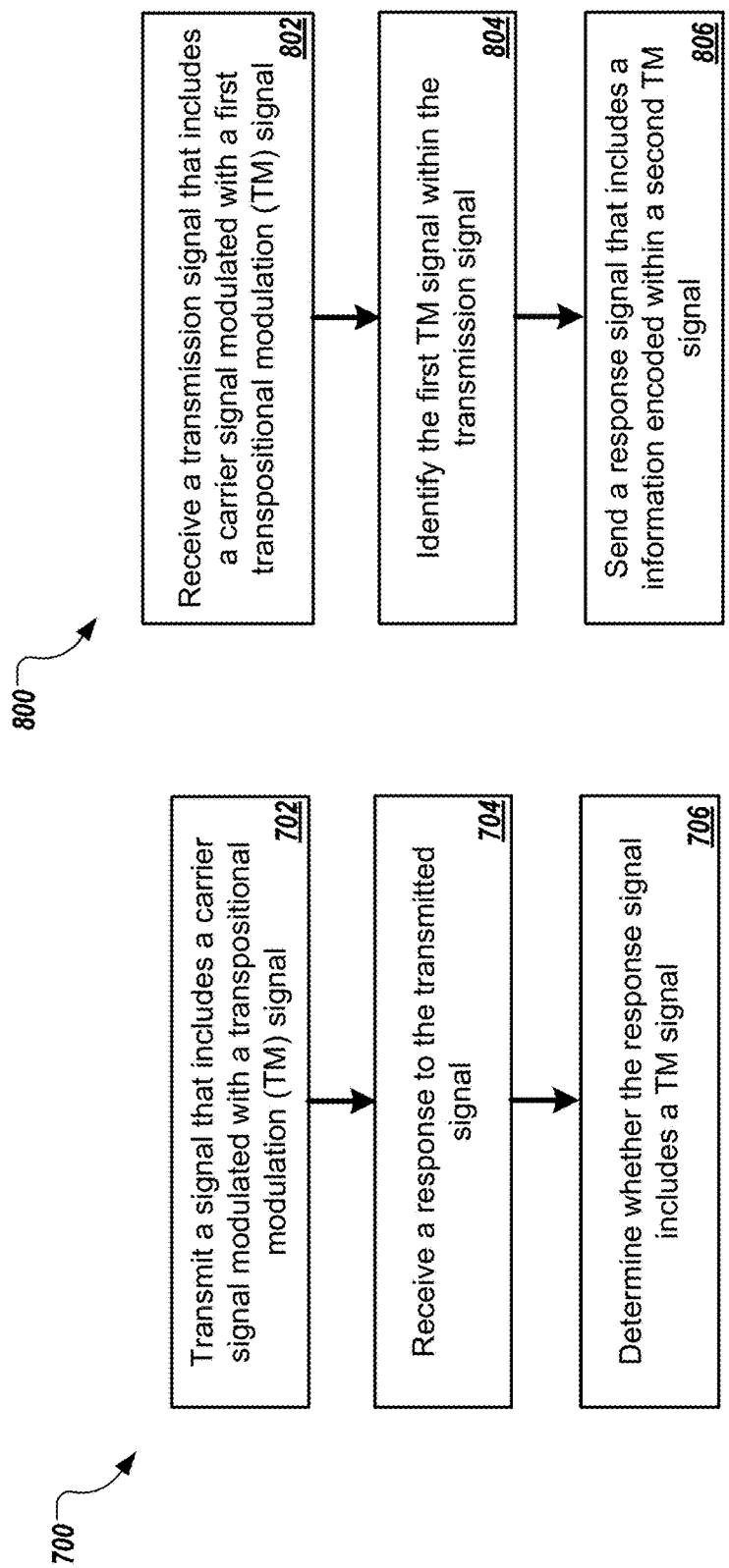

TRANSPOSITIONAL MODULATION COMMUNICATIONS BETWEEN DEVICES

CROSS REFERENCE TO RELATED APPLICATIONS

This application is a continuation application of U.S. patent application Ser. No. 15/293,910, filed on Oct. 14, 2016, which is a continuation application of U.S. patent application Ser. No. 15/139,213, filed on Apr. 26, 2016, now U.S. Pat. No. 9,473,983, which are hereby incorporated by reference in their entirety.

BACKGROUND

Carrier modulation techniques are used to transmit information signals from one location to another. Traditional signal modulation techniques include, for example, amplitude modulation (AM), frequency modulation (FM), and phase modulation (PM). In addition, complex modulation techniques exist that incorporate aspects of AM, FM, and PM such as quadrature phase shift keying (QPSK), amplitude phase shift keying (APSK) and including quadrature amplitude modulation (QAM).

SUMMARY

This specification relates to methods and systems for performing communications between transpositional modulation (TM) capable devices. More specifically, the specification relates to methods and systems for conducting electronic communications using TM signals between TM capable devices. In addition, the specification relates to methods and systems for conducting communications between devices using a combined traditional modulation and TM signal on the same carrier signal. In addition, the specification describes performing device identification and/or device discovery using TM signals. Although discussed in the context of TM, implementations of the present disclosure also may be applicable to identifying other aspects or characteristics of various devices.

In general, innovative aspects of the subject matter described in this specification can be embodied in methods that include the actions of determining, by a first device, that a second device is within range for direct communications and that the second device is capable of performing TM communications. Determining to use transpositional modulation to send data to the second device. Sending the data to the second device using a TM signal. Other implementations of this aspect include corresponding systems, apparatus, and computer programs, configured to perform the actions of the methods, encoded on computer storage devices.

In another general aspect, innovative aspects of the subject matter described in this specification can be embodied in a communication device that includes one or more processors, a receiver coupled to the one or more processors, a transmitter coupled to the one or more processors, and a data store coupled to the one or more processors. The data store includes instructions stored thereon which, when executed by the one or more processors, causes the one or more processors to perform operations including determining that a second device is within range for direct communications and that the second device is capable of performing TM communications. Determining to use transpositional modulation to send data to the second device. Sending the data to the second device using a TM signal.

These and other implementations can each optionally include one or more of the following features. In some implementations, determining to use transpositional modulation to send the data to the second device includes determining to use transpositional modulation to send the data to the second device based on an amount of network traffic using non-TM signals.

In some implementations, determining to use transpositional modulation to send the data to the second device includes determining to use transpositional modulation to send the data to the second device based on an amount of the data to be sent.

In some implementations, determining to use transpositional modulation to send the data to the second device includes determining to use transpositional modulation to send the data to the second device based on a type of the data.

In some implementations, determining to use transpositional modulation to send the data to the second device comprises determining, based on the data being a direct current (DC) signal, to use transpositional modulation to send the data to the second device.

Some implementations include selectively sending data to the second device using TM signals to manage data flow to within a network.

In some implementations, determining that the second device is within range for direct communications includes determining that a quality of a signal received from the second device is above a threshold value for direct communications.

Some implementations include determining that the second device is capable of performing TM communications by transmitting a transmission signal including a carrier signal modulated with a first TM signal to the second device. Receiving a response signal from the second device in response to the transmission signal. And, determining whether the response signal includes a second TM signal.

In some implementations, determining whether the response signal includes the second TM signal includes mixing the response signal with a second harmonic of a carrier signal of the response signal to produce a mixed signal, and comparing the mixed signal to a third harmonic of the carrier signal of the response signal.

In some implementations, sending the data to the second device using a TM signal includes receiving a signal including a carrier signal modulated with a non-TM modulation signal. Detecting a frequency of the carrier signal by performing a carrier extraction (CAREX) process on the signal. Adding the TM signal to the carrier signal of the received signal to produce a combined signal. Transmitting the combined signal.

Some implementations include determining to use a non-TM modulation to send second data to the second device and sending the second data to the second device using a non-TM signal.

Particular implementations of the subject matter described in this specification can be implemented so as to realize one or more of the following advantages. Implementations may provide an efficient process for identifying TM capable devices. Implementations may increase the bandwidth of signals transmitted using traditional modulation schemes. Implementations may permit the combination of two differently modulated signals on a single carrier frequency. Some implementations may permit extraction of carrier signals from a modulated signal with little or no a priori information about the modulated signal. Some implementations may be capable of extracting a carrier from a modulated signal without regard to the type of modulation used in the modulated signal. In other words, some implementations may able to extract carrier signals while being agnostic to the type modulation of an input signal.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3B depicts a block diagram of an example frequency detector in accordance with implementations of the present disclosure.

FIGS. 7-11 depict example processes that can be executed in accordance with implementations of the present disclosure.

Like reference numbers and designations in the various drawings indicate like elements.

DETAILED DESCRIPTION

Figure 1A:
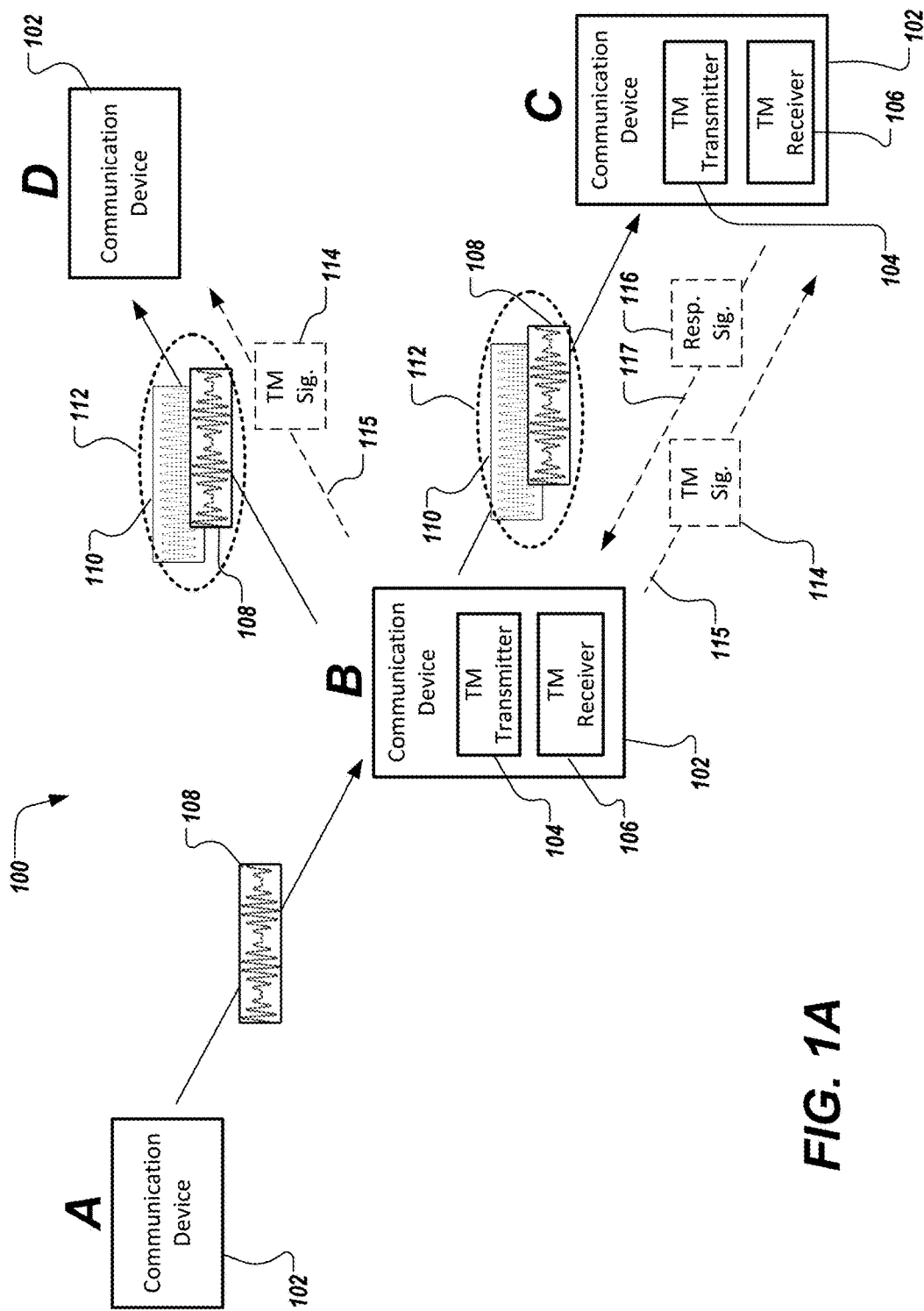
FIGS. 1A-1B depict example systems in accordance with implementations of the present disclosure.

Implementations of the present disclosure generally relate to methods and systems for performing communications between transpositional modulation (TM) capable devices. More specifically, implementations provide methods and systems for conducting electronic communications using TM signals between TM capable devices. For example, a communication device can identify TM capable devices that are within range for direct communications. The communication device can determine whether to conduct communications with other TM capable devices using TM signals or non-TM signals. In some examples, a communication device can use TM to balance data usage within a communication network. In some examples, a communication device can prevent degradation in communication quality within a communication network by balancing the data usage between TM and non-TM signals.

Some implementations provide methods and systems for performing device identification and/or device discovery using TM signals. For example, TM signals can be transmitted as a device query signal and devices that are TM capable will be able to respond, while non-TM devices may not be able to respond at all or may not be able to respond with a corresponding TM signal. In addition, some implementations establish communications between devices using a combined traditional modulation and TM signal on the same carrier signal. For example, supplementary information can be carried in a TM signal combined with a traditional modulation signal that is routinely used for communications between devices. The TM signal will not interfere substantially with the traditional modulation signal, thereby, increasing the effective bandwidth of the communications between devices.

Some implementations of the present disclosure relate to methods and systems for combining TM signals with traditional modulation (non-TM) signals. For example, implementations provide methods and systems for receiving an existing non-TM signal and adding a TM signal to the carrier of the non-TM signal with minimal or no interference to the non-TM signal. For example, an existing non-TM signal can be received by a TM capable communication device. The communication device can extract the carrier signal from the non-TM signal, modulate the extracted carrier with additional data using a TM signal, and combine the TM signal with the received non-TM signal with minimal or no interference to the non-TM signal.

Other implementations of the present disclosure generally extract a carrier signal from an existing modulated signal, modulate the extracted carrier signal with a TM signal, and combine and retransmit the existing signal with the TM signal on the same carrier signal. Specifically, the implementations can extract a carrier frequency from a modulated signal in which the carrier signal has been suppressed (e.g., QPSK, QAM, APSK, BPSK). A CAREX (carrier extraction) circuit determines a frequency difference between the frequency of the CAREX output signal and a weighted average of the carrier frequency of the input signal. The calculated difference value is used to continuously tune a signal generator to maintain a minimal difference between the weighted average of the input carrier frequency and the CAREX output. The third harmonic of the extracted carrier is modulated with a data signal generating a TM modulated signal. The TM modulated signal is heterodyned back to the extracted carrier frequency and combined with the existing modulated signal. The combined signal can then be transmitted. Moreover, the TM modulated signal in the combined signal does not interfere with the existing signal because the TM modulation is not recognized by demodulation systems used to demodulate traditional modulation schemes. Instead, the TM signal appears as a slight increase in noise within the existing signal.

Other implementations of the present disclosure generally receive a combined traditional modulation and TM signal on the same carrier signal then separate the TM signal from the combined signal. Specifically, the implementations can separate the existing signal from a combined signal including a traditionally modulated signal (the existing signal) and a TM modulated signal. The existing signal can be demodulated from the carrier signal. An extracted carrier signal can be re-modulated with the demodulated existing signal to re-create the existing signal alone, absent the TM modulated signal. The re-modulated existing signal can be removed from the combined signal leaving only the TM modulated signal which can be demodulated using TM demodulation techniques described herein.

As used herein the terms "Transpositional Modulation," "TM modulation," "TM," and "TM signal" refer to a techniques of adding information to a carrier signal without affecting the amplitude, frequency or phase of the carrier signal (or a signal that is modulated according to such a technique). More specifically, for example, the above terms refer to a type of modulation in which information is conveyed by altering (e.g., transposing, time shifting) a harmonic of a carrier signal. For example, although the present disclosure is generally directed to producing Transpostional Modulation by altering the third harmonic of a carrier signal, in some implementations Transpostional Modulation can be produced by altering other harmonics of a carrier signal (e.g., a fourth harmonic, fifth harmonic, sixth harmonic, etc.). Furthermore, Transpositional Modulation and/or TM signals are not detectable by traditional demodulators, for example, those used for amplitude, frequency, or phase modulated signals.

As used herein the term "real time" refers to transmitting or processing data without intentional delay given the processing limitations of the system, the time required to accurately measure the data, and the rate of change of the parameter being measured. For example, "real time" communication operations within a communication system should be capable of transmitting, receiving, and processing data without intentional delay, and without any user perceptible delays. For example, "real time" communications in a system should be capable of processing a video chat session between two communication devices with little or no perceptible delay in audio or video data presented to users of the communication devices.

FIG. 1A depicts an example system 100 in accordance with implementations of the present disclosure. The system 100 is a system of communication devices 102. The system 100 may be a radio frequency (RF) communication system, a satellite communication system, a landline communication system (e.g., a telephony or cable network), an optical communication system, a computer network, or any other system of communication devices 102. The communication devices 102 include systems for modulating a carrier signal with an information signal using traditional modulation techniques and transmitting and receiving the modulated signal from one communication device 102 to/from another. For example, communication device A may be a cellular base station, and communication devices B, C, and D may be mobile devices (e.g., smartphones). Traditional modulation techniques include, for example, amplitude modulation (AM), frequency modulation (FM), and phase modulation (PM) in addition to complex modulation techniques that incorporate aspects of AM, FM, and PM such as quadrature phase shift keying (QPSK), amplitude phase shift keying (APSK) and including quadrature amplitude modulation (QAM). In addition, communication devices B and C include a TM transmitter 104 and a TM receiver 106. In some examples, a TM transmitter 104 and/or a TM receiver 106 can be integrated with traditional transmitters and receivers. The TM transmitter 104 and/or TM receiver 106 can be implemented as hardware devices (e.g., integrated circuits, chip-sets, application specific integrated circuits (ASIC) or field programmable logic arrays (FPGA)) or they can be implemented in software (e.g., as a software defined radio (SDR)).

The system 100 can receive a traditionally modulated signal 108 and combine the traditionally modulated signal 108 with a TM modulated signal 110 on the same carrier using a TM transmitter 104, thereby, increasing the overall bandwidth of the combined signal 112. The TM modulated signal 110 can be separated from the combined signal 112 and demodulated by a TM receiver 106. Likewise, the traditionally modulated signal 108 can be separately demodulated with no interference caused by the TM modulated signal 110. This is possible because TM modulated signals are undecipherable by non-TM receivers, instead appearing as a slight increase of noise in traditionally modulated signals.

For example, communication device A may transmit a QAM signal 108 to communication device B. The TM transmitter 104 at communication device B can receive the QAM signal 108 and extract the carrier signal from the QAM signal 108. The TM transmitter 104 modulates the extracted carrier signal with a TM signal, combines the TM modulated signal 110 with the QAM signal 108, and retransmits the combined signal 112. In some examples, as described below, the TM transmitter 104 can extract a carrier signal from a traditionally modulated signal 108 (e.g., the QAM signal) in which the carrier is suppressed and while having little or no a priori information about the carrier signal (e.g., frequency or phase information).

Communication devices C and D can then receive the combined signal 112. The TM receiver 106 of communication device C separates and extracts the TM modulated signal 110 from the combined signal 112, and then demodulates the TM modulated signal 110 to obtain the TM modulated data signal. In some examples, as described below, the TM receiver 106 separates the TM modulated signal 110 from the combined signal 112 by demodulating traditionally modulated signal 108 (e.g., the QAM signal), re-modulating the carrier with only the traditionally modulated signal 108, and subtracting the re-modulated carrier signal from the combined signal 112 leaving only the TM modulated signal 110. On the other hand, communication device D, which does not have a TM receiver 106, will only detect and demodulate the traditionally modulated signal 108; not the TM modulated signal 110.

In some implementations, the carrier signal can be an intermediate frequency (IF) carrier signal. That is, the carrier signal is not necessarily at the same frequency of the carrier upon which the signal is ultimately be transmitted, but may be at an IF used internally within a system (e.g., a satellite communication system) as an intermediate step in either signal transmission or reception. That is, in the case of signal transmission, a system may up-convert a combined signal 112 from the IF signal to a transmission carrier frequency prior to transmitting the combined signal 112. Conversely, in the case of signal reception, a system may down-convert a modulated signal from the transmission carrier frequency to an IF frequency before separating the TM modulated signal 110 from the combined signal 112. In other implementations, an IF carrier signal may not be used, and the transmission carrier signal can be modulated with both a traditionally modulated signal and a TM modulated signal.

In some implementations, because TM signals are not detectable by traditional receivers, a TM capable device can identify whether other devices have TM reception and transmission capabilities by transmitting a carrier signal modulated with a TM signal to the other devices. For example, communication device B can send a query signal 114 that includes a carrier signal modulated with a TM signal to one or more other devices (as indicated by dashed line 115), such as communication device C and communication device D. Communication device C, which includes a TM transmitter 104 and a TM receiver 106, will be able to detect the TM modulation within the query signal 114. However, communication device D, which does not include a TM transmitter 104 or a TM receiver 106, will detect only the carrier wave of the query signal. Thus, communication device C will be able to respond to the query signal 114, but communication device D will not. Communication device C sends a response signal 116 to communication device B (as indicated by dashed line 117) that includes a carrier signal modulated with a TM signal. Communication device B will detect the TM signal included in the response signal 116 and, thereby, determine that communication device C is capable of TM communications.

The query signal 114 can include, for example, only a carrier signal with TM modulation (e.g., signal 110) or a combined signal 112 including a carrier modulated with both a traditionally modulated signal 108 and a TM modulated signal 110. In some examples, the query signal 114 can include instructions requesting information about the other device encoded in either a TM modulated signal 110, a traditionally modulated signal 108, or both. However, in some examples, the TM modulated signal 110 need not include any specific information or instructions because if another device is not capable of receiving TM signals the other device would not even detect the TM modulated signal 110 or the encoded information. Thus, a TM capable device need only send a response signal 116 that includes TM modulation to indicate that the device is capable of receiving TM signals.

In implementations in which the query signal 114 includes both a traditionally modulated signal 108 and a TM modulated signal 110, devices that are not capable of TM communications (e.g., communication device A) may send a response to the non-TM portion of the query signal 114. However, a response from a non-TM capable device would only include a traditionally modulated signal and not a TM modulated signal. Therefore, to determine whether a responding device was TM capable, the querying device (e.g., communication device B) would only need to determine whether the response included a TM modulated signal 110. If not, the response can be ignored.

In some implementations, the query signal 114 can include information about the querying device (e.g., communication device B). For example, the TM modulated portion of the query signal 114 can contain information including, but not limited to, characteristics of the device such as identifying information, location information for the device, routing tables, identifying information for other TM capable devices in communication with the responding device, network channel characteristics (e.g., noise, bandwidth), handshake data, device paring data, authentication data (e.g., Out-Of-Band (OOB) authentication data), etc.

In some implementations, the response signal 116 can include information about the responding device. For example, the TM modulated portion of the response signal 116 from a TM capable device (e.g., communication device C) can include information about the device. The information can include, but is not limited to, characteristics of the device such as identifying information, location information for the device, routing tables, identifying information for other TM capable devices in communication with the responding device, network channel characteristics (e.g., noise, bandwidth), handshake data, device paring data, authentication data (e.g., OOB authentication data), etc. In some examples, the query signal 114 can include a request for particular information about the responding device. For example, the TM modulated portion of the query signal 114 from the querying device (e.g., communication device B) can include a request for information about the responding device. In such examples, a TM capable responding device would be able to detect the information request and provide the requested information in a response signal 116.

Communication device B and C can conduct continued communications between each other using TM signals. For example, after communication device B and C have identified each other as being capable of conducting electronic communications using TM signals, the two devices can conduct further communications using TM modulated signals, traditional (non-TM) modulated signals, or both. In some implementations, once communication devices B and C recognize each other as being TM capable, the two devices can conduct communication using TM signals exclusively, for example, to free non-TM bandwidth in a communication network for use by other devices that are not TM capable.

In some implementations, the communication devices B and C can conduct communication using TM signals when predetermined conditions exist, for example, to make more efficient use of bandwidth in a network of communication devices. For example, such predetermined conditions can include, but are not limited to, periods of high network data traffic, transmission of particular types of data, or transmission of data that exceeds a threshold size (e.g., transfers of large amounts of data). For example, a period of high network data traffic can be identified when network traffic using non-TM signals reaches a threshold percentage of a channel's bandwidth. Particular types of data can include, for example, data types that use significant portions of a channel bandwidth such as streaming data (e.g., streaming video or audio), real time data (e.g., video chat), analog data, and data indicated as high priority (e.g., emergency notification data).

Figure 1B:
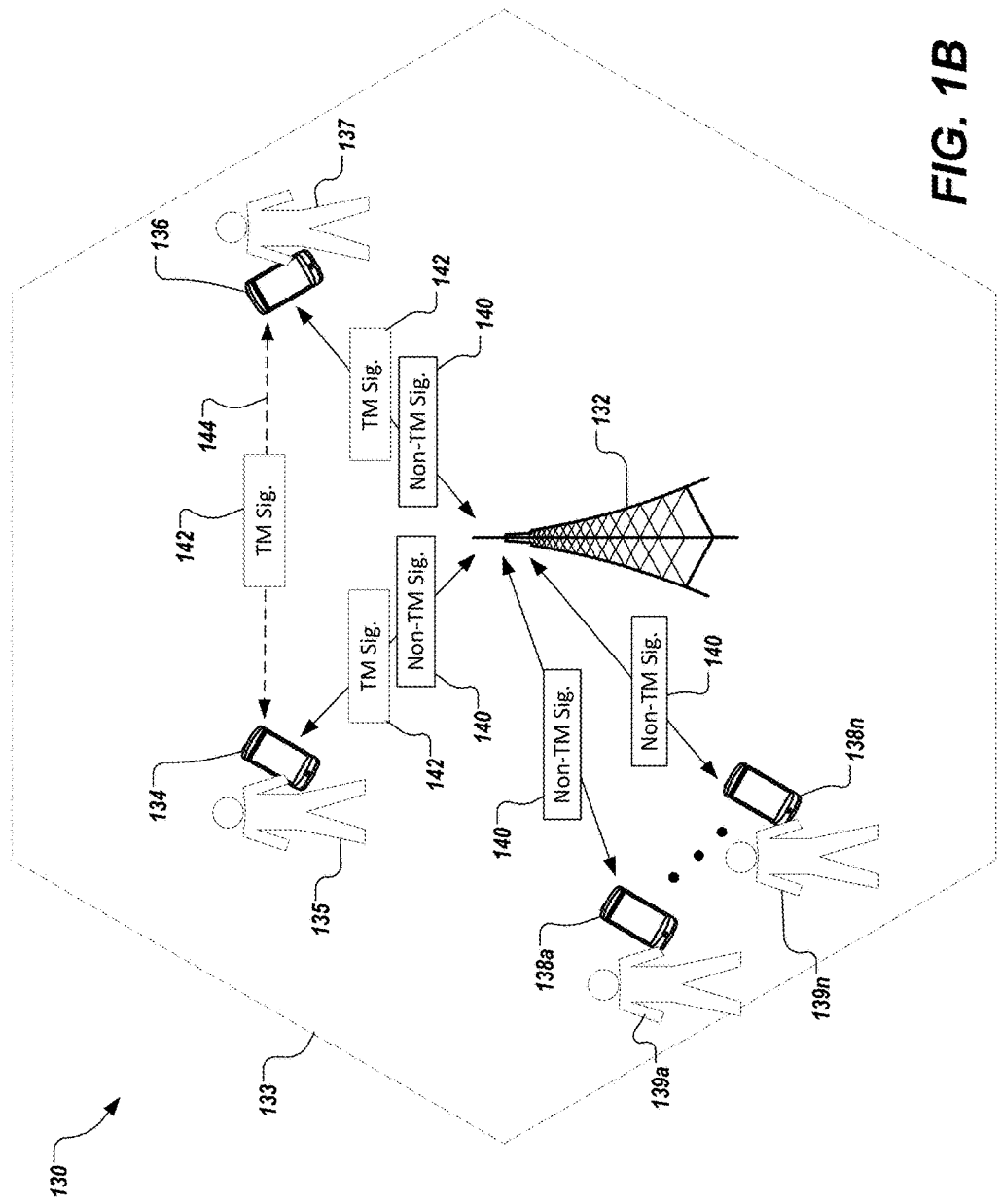

FIG. 1B depicts an example environment 130 for employing the techniques discussed above. The example environment is described in the context of cellular communication network (e.g., a cellular communication front haul network). It is appreciated, however, that implementations of the present disclosure can be realized in other appropriate environments and contexts including, but not limited to, for example, computer networks, Internet of Things (IoT) networks, computer peripherals (e.g., plug and play devices), device pairing, authentication protocols, near-field communications (NFC), inventory systems, broadcast and/or cable-cast systems, satellite systems, self-driving vehicles, autonomous vehicle communications (e.g., unmanned aerial vehicles (UAV)), traffic signal preemption systems (e.g., used by emergency service vehicles), etc.

The environment 130 includes a base station 132 in communication with several mobile devices 134, 136, 138a-138n. The base station 132 can be a radio base station (RBS) for a cellular communication system. The base station 132 can include cellular transmitters, receivers, and computing equipment for processing cellular communications with the mobile devices 134, 136, 138a-138n. In addition, the base station 132 is capable of conducting electronic communications with TM modulated signals. For example, the base station 132 can include TM transmitter(s) and TM receiver(s) such as those described below in reference to FIGS. 2 and 5, respectively. It is appreciated, however, that in other contexts communication devices such as a router, server, wireless access point, etc. could perform the operations similar to those described in reference to the base station 132.

The mobile devices 134, 136, 138a-138n are associated with respective users 135, 137, 139a-139n. The mobile devices 134, 136, 138a-138n can each include various forms of a processing device including, but not limited to, a laptop computer, a tablet computer, a wearable computer, a handheld computer, a personal digital assistant (PDA), a cellular telephone, a network appliance, a smart phone, an enhanced general packet radio service (EGPRS) mobile phone, a mobile hotspot, or an appropriate combination of any two or more of these example communication devices or other communication devices. Furthermore, mobile devices 134 and 136 are capable of conducting electronic communications with TM modulated signals. For example, the mobile devices 134 and 136 can each include a TM transmitter and a TM receiver such as those described below in reference to FIGS. 2 and 5, respectively.

In operation, the base station 132 communicates with mobile devices 134, 136, 138*a*-138*n* that are located within a network cell 133 served by the base station 132. When the bandwidth of data communicated between the mobile devices 134, 136, 138*a*-138*n* and the base station 132 (e.g., network traffic) approaches the data capacity of a communication channel (e.g., wireless frequency band(s)) for the cell 133 the quality of communications between the mobile devices 134, 136, 138*a*-138*n* and the base station 132 tends to degrade. For example, communications can be lost between a particular one of the mobile devices 134, 136, 138*a*-138*n* and the base station 132 or data transmission rates experienced by the mobile devices 134, 136, 138*a*-138*n* can degrade.

Implementations of the present disclosure may alleviate such degradations in communication quality by using TM signals 142 to conduct some of the communications within the network cell 133. For example, because TM signals 142 and non-TM signal 140 appear transparent to each other by receivers, the TM and non-TM modulated signals can exist within the same communication channel while causing little to no interference with each other. Consequently, the base station 132 can conduct some or all of its communication with TM capable mobile devices 134, 136 using TM signals 142, thereby, freeing non-TM channel bandwidth for communications with mobile devices 138*a*-138*n* that are not TM capable.

For example, a base station 132 can identify TM capable mobile devices 134, 136 within communication range of the bases station 132 in the cell 133. In some examples, the base station 132 can identify TM capable mobile devices 134, 136 using a process similar to that discussed above in reference to FIG. 1A. For example, the base station 132 can transmit TM query signals and identify mobile devices 134, 136 that are TM capable by determining which devices respond to the TM query signals. In some example, the base station 132 can determine whether a TM capable device 134, 136 is within range for communications with the base station 132 based on location data from a mobile device, based on the strength of a signal received from the mobile device, or by using a TM capable device identification process similar to that discussed above in reference to FIG. 1A (e.g., based on the response signal strength or location data included in the response).

The base station 132 can determine whether to communicate with the TM capable mobile devices 134, 136 using TM signals 142, non-TM signal 140, or a combination of both. For example, the base station 132 may use non-TM communication signals as a default communication method with mobile devices 134, 136, 138*a*-138*n*. The base station 132 can incorporate TM signals 142 for communication with the TM capable mobile devices 134, 136 when a predetermined criteria is met. For example, various predetermined criteria can be used to determine when to incorporate TM communications so as to make more efficient use of channel bandwidth. For example, such predetermined criteria can include, but are not limited to, data traffic within a channel in excess of a threshold value, transmissions of particular types of data, or transmission of data that exceeds a threshold size (e.g., data files or data packets that exceed a threshold size). For example, if data traffic using non-TM signal 140 within the cell 133 meets or exceeds a predetermined threshold value, the base station 132 can begin communicating with the TM capable devices 134, 136 using TM signals 142 exclusively or using a combination of TM and non-TM signals. Shifting some of the data traffic within the cell 133 to TM signals 142 can alleviate the data traffic using non-TM signals 140 and may, thereby, prevent or reduce any degradation in the quality of communications with the cell 133. A predetermined threshold value for data traffic can be, for example, a percentage of channel capacity for communication channels within the cell. For example, if data traffic within the cell 133 reaches 80% of the channel capacity for the cell 133 using non-TM signals 140, the base station 132 can begin using TM signals 142 to communicate with TM capable devices 134, 136.

As another example, if particular types of data or an amount of data larger than a predetermined size ("large amounts of data") are being transmitted to or from TM capable devices 134, 136, the base station 132 or TM capable device 134, 136 can use TM signals 142 to transmit the particular type of data or the "large amount of data to, for example, prevent data congestion within the cell 133 using non-TM signals 140. For example, particular types of data that can trigger the use of TM signals 142 can include, but are not limited to, data types that use significant portions of a channel bandwidth such as streaming data (e.g., streaming video or audio), real time data (e.g., video chat), analog data (e.g., analog direct current (DC) or alternating current (AC) signals), and data indicated as high priority (e.g., emergency notification data). In some examples, low bandwidth data (e.g., SMS messages, text only e-mail messages, etc.) may be prioritized for transmission using TM signals 142. For example, at times when bandwidth within a cell 133 is in high demand (e.g., during a local emergency or a large public event), low bandwidth messages may be prioritized for transmission using TM signals 142, for example, to permit more message traffic to be transmitted within the cell 133 during such events.

In some implementations, the base station 132 can communicate with TM capable mobile devices 134, 138 using TM signals 142 regardless of a predetermined criteria. For example, once the base station 132 identifies a mobile device 134, 136 as being TM capable, the base station 132 can conduct communications with such a mobile device 134, 136 using TM signals 142 exclusively or using a combination of TM and non-TM signal 140. In some examples, the base station 132 can balance the overall amount of data being communicated between TM signals 142 and non-TM signals 140 within the cell 133. For example, the base station 132 can manage its communications with various mobile devices 134, 136, 138*a*-138*n* within the cell 133 so as to balance the total data bandwidth used between TM and non-TM signals. In some examples, the base station 132 can give priority of bandwidth usage to TM capable mobile devices 134, 136. For example, the base station 132 can manage the data usage within the cell 133 such that TM capable mobile devices 134, 136 are allotted higher data rates using TM signals 142 than non-TM capable mobile devices 138*a*-138*n* using non-TM signals 140. Such an advantage may be provided because the TM capable mobile devices 134, 136 within the cell 133 permit the base station 132 to more efficiently manage data traffic within the cellular network. In addition, such an advantage may incentivize increased adoption of TM capable mobile devices 134, 136.

Although the above implementations have been described in reference to non-TM signals as being a default communication method between a base station 132 and mobile devices 134, 136, 138a-138n within a cell 133, in some implementations TM signals may be used as a default communication method. For example, the processed described above may be reversed. That is, TM signals may be used as the default method for communicating with mobile devices 134, 136, 138a-138n within a cell 133 and the base station 132 can use processes similar to those discussed above to determine whether to use non-TM signals to communicate with particular mobile devices 134, 136, 138a-138n. For example, a base station 132 can use any or all of the above discussed predetermined criteria to determine when to incorporate non-TM communications.

In some implementations, one TM capable mobile device 134 can conduct communications with another TM capable mobile device 136 directly (as indicated by dashed line 144). For example, mobile device 134 can determine that mobile device 136 is a TM capable device and is within range for direct communications. If the user 135 of mobile device 134 desires to call the user 137 of mobile device 136, mobile device 134 can establish communications with mobile device 136 using TM signals 142. For example, direct communications between mobile devices 134 and 136 may be performed using TM signals 142 within the same communication channel as non-TM signal 140 communications between the base station 132 and mobile devices 138a-138n without interfering with the non-TM signal 140 communications between the base station 132 and mobile devices 138a-138n. In some examples, the mobile devices 134 and 136 can conduct direct communications using TM signals 142 in a communication channel that is not used by the base station 132 (e.g., the industrial, scientific and medical (ISM) radio bands). In such examples, the TM based communications between mobile devices 134 and 136 will not affect non-TM communications between mobile devices using non-TM signals within the communication channel. In some examples, direct communications between mobile devices 134, 136 may reduce the data processing load on the base station 132.

In some implementations, a mobile device can determine whether another mobile device is within range for direct communications by obtaining location data for the second mobile device. For example, mobile device 134 can obtain location data for mobile device 136 from the base station 132 or through the cellular network (e.g., if mobile device 134 and 136 are located in different cells). For example, mobile device 134 may receive data related to mobile devices associated with contacts stored in a contact list (e.g., a phonebook) on the mobile device 134, and such data can include location data. For example, the mobile device 134 can use location data of other mobile devices to determine their distance from the mobile device 134 and whether such mobile devices are in range for direct communications. In some examples, if contact data for user 137 is stored in a contact list on mobile device 134, mobile device 134 can display an icon next to the user's 137 contact data indicating that mobile device 136 is within range for direct TM communications. In some examples, user 135 can initiate direct communications with mobile device 136 by selecting the icon.

In some implementations, a mobile device can determine whether another TM capable mobile device is within range for direct TM communications by using a process similar to that discussed above in reference to FIG. 1A. For example, mobile device 134 can transmit a TM query signal to identify other TM capable mobile devices (e.g., mobile device 136) that are within range for direct communications. The mobile device 134 can identify TM capable mobile devices that are within range based on the strength of a response signal received from other mobile devices, based on the quality (e.g., signal to noise ratio (SNR), or bit error rate (BER)) of the response signal received, based location data included in a response, or based on a combination of any of the preceding three factors.

For example, mobile device 134 can determine that mobile device 136 is within range for direct communications based on comparing a received signal strength to a threshold signal strength value for direct communications. If, for example, the received signal strength is greater than or equal to the threshold value, mobile device 134 can determine that mobile device 136 is within range for direct communications. For example, mobile device 134 can determine that mobile device 136 is within range for direct communications based on comparing a quality (e.g., SNR or BER) of a received to a threshold quality value for direct communications. If, for example, the quality of the received signal is better (e.g., greater than for SNR or less than for BER) than or equal to the threshold value, mobile device 134 can determine that mobile device 136 is within range for direct communications.

In some implementations, a mobile device can require confirmation from another TM capable mobile device that the other TM capable mobile device is within range for direct TM communications before initiating direct TM communications with the other device. For example, in some circumstances, one communication device (e.g., mobile device 134) may determine that another communication device (e.g., mobile device 136) is within range for direct TM communications based one of the above discussed processes (e.g., using location data, signal strength, or signal quality). However, mobile device 136 may determine that mobile device 134 is not within range for direct TM communications. For example, mobile device 136 may be located in an environment with significant electromagnetic noise. For example, mobile device 134 may receive a signal from mobile device 136 with a high SNR and/or low BER, however, a signal received by mobile device 136 from mobile device 134 may have a low SNR and/or a high BER. Accordingly, in some implementations, mobile a communication device, such as mobile device 134, can wait to conduct direct TM communications with another mobile device, such as mobile device 136, until receiving confirmation that the other mobile device has also determined that the two devices are within range for direct communications (e.g., that the received signal strength or received signal quality of both devices is appropriate for direct communications).

Figure 2:
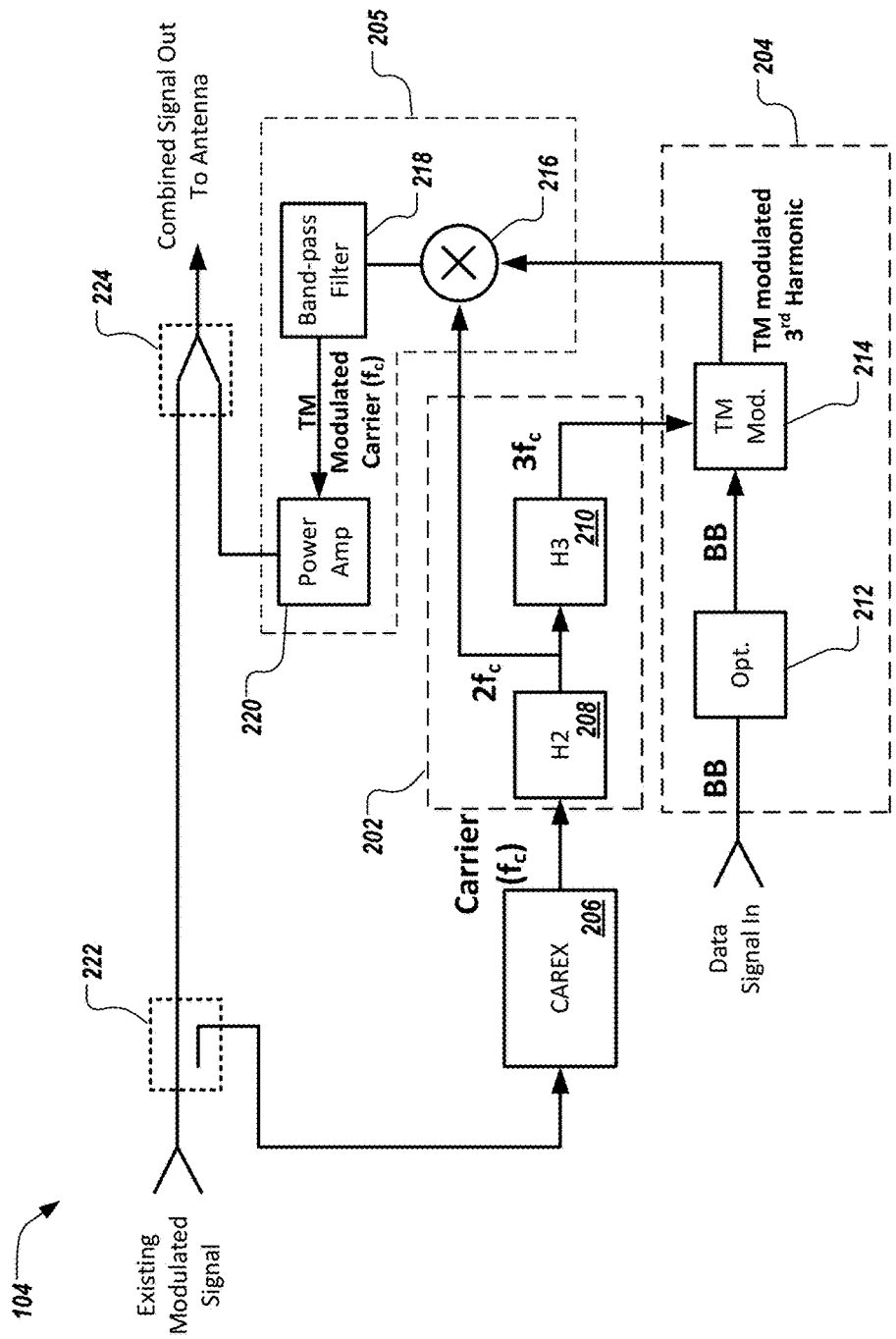
FIG. 2 depicts a block diagram of an example TM signal transmitter in accordance with implementations of the present disclosure.

FIG. 2 depicts a block diagram of an example TM signal transmitter 104 in accordance with implementations of the present disclosure. The TM transmitter 104 includes a carrier extraction portion (CAREX) 206, a harmonic generation portion 202, a TM modulating portion 204, and a heterodyning portion 205. The carrier extraction portion includes the carrier extractor (CAREX) 206. The harmonic generation portion 202 includes a second harmonic generator 208 and a third harmonic generator 210. The TM modulating portion 204 includes a signal optimizer 212 and a TM modulator 214. And, the heterodyning portion 205 includes a signal mixer 216, a bandpass filter 218, and a power amplifier 220. In addition, the TM transmitter 104 includes a signal coupler 222 and a signal combiner 224.

In operation, the TM transmitter 104 receives an existing modulated signal (e.g., traditionally modulated signal 108 of FIG. 1). The signal coupler 222 samples the existing modulated signal and passes the sample of the existing modulated signal to the CAREX 206. The CAREX 206 extracts a carrier signal ($f_c$) from the existing modulated signal. The CAREX 206 is described in more detail below in reference to FIGS. 3A-4B. The output of the CAREX 206 is a pure sinusoidal signal at the fundamental frequency of the carrier from the existing modulated signal. In some examples, the CAREX 206 is agnostic to the type of modulation used in the existing modulated signal. That is, the CAREX 206 can extract the carrier signal from an existing modulated signal regardless of the type of modulation used in the existing modulated signal. In some examples, the CAREX 206 can extract carrier signals even when the carrier is suppressed in the existing modulated signal, and can do so with little or no a priori information about existing modulated signal's carrier (e.g., frequency or phase modulation information).

The CAREX 206 passes the extracted carrier signal to a second harmonic signal generator 208 and a third harmonic signal generator 210, which generate signals at the second and third harmonic frequencies ($2f_c$ and $3f_c$ respectively) of the fundamental carrier frequency ($f_c$). The second and third harmonic signals ($2f_c$, $3f_c$) are used by the TM modulation portion 204 and the heterodyning portion 205 of the TM transmitter 104 to generate a TM modulated signal and to heterodyne the TM modulated signal to the fundamental carrier frequency ($f_c$).

The TM modulation portion 204 of the TM transmitter 104 modulates the third harmonic ($3f_c$) of the carrier signal ($f_c$) with a data signal to generate the TM modulated signal. The TM modulated signal is then heterodyned to the frequency of the carrier signal ($f_c$), combined with the existing modulated signal, and outputted to an antenna for transmission.

In more detail, TM modulation portion 204 receives a data signal for transmission (e.g., a baseband (BB) data signal). The data signal is optionally processed for transmission as a TM modulated signal by the signal optimizer 212. In some examples, the signal optimizer 212 produces an optional pattern of inversion and non-inversion of the modulating signal, and filters the modulating signal to ensure that the total bandwidth of the data signal is within the channel bandwidth of the existing modulated signal. In some examples, the signal optimizer 212 can include sample-and-hold circuitry and filters to prepare the modulating signal for transmission as a TM modulated signal. In some examples, the signal optimizer 212 can be bypassed or turned off and on.

The TM modulator 214 modulates the third harmonic ($3f_c$) of the carrier signal ($f_c$) with a data signal to generate the TM modulated signal. For example, the TM modulator 214 modulates the third harmonic ($3f_c$) by introducing a variable time delay based on the data signal. In other words, the TM modulator 214 can use the data signal as a control signal for introducing an appropriate time delay to third harmonic ($3f_c$). As such, an amount of time delay introduced into the third harmonic ($3f_c$) represents discrete bits or symbols of the data signal. The described time delay modulation technique may be considered as time-shift modulation and is performed on the third harmonic ($3f_c$) of the intended carrier frequency ($3f_c$).

The time-shift modulation of the third harmonic ($3f_c$) produces a single set of upper and lower Bessel-like sidebands. The inventor has confirmed such results in laboratory simulations with an oscilloscope and spectrum analyzer. Moreover, the bandwidth of these sidebands can be limited to the bandwidth of an intended communication channel by the optimizer 212 before TM modulation of the signal, as described above.

In some examples, the time delay may be a phase shift. However, the time-shift modulation described above is not equivalent phase modulation. As noted above, the inventor has confirmed in laboratory tests that the time-shift modulation only produces a single pair of upper and lower Bessel-like sidebands. Phase modulation, however, produces a series upper and lower Bessel-like sidebands.

The heterodyning portion 205 prepares the TM modulation signal do be combined with the existing modulated signal and transmitted by the receiver. The TM modulated signal is then heterodyned (e.g., frequency shifted) by mixer 216 down to the fundamental frequency of the carrier signal ($f_c$). The mixer 216 multiplies the TM modulated signal with the second harmonic of the carrier ($2f_c$) which shifts the TM modulated signal to both the fundamental carrier signal frequency ($f_c$) and the fifth harmonic frequency of the carrier. The bandpass filter 218 removes signal at the fifth harmonic frequency as well as any additional signals or noise outside of the bandwidth of the TM modulated signal centered at the fundamental carrier signal frequency ($f_c$).

The TM modulated carrier signal is amplified by power amplifier 220 and combined with the existing modulated signal by the signal combiner 224. It may be necessary, in some examples, to adjust the phase of the TM modulated carrier signal to match the phase of the carrier in the existing modulated signal before combining the two signals.

Figure 3A:
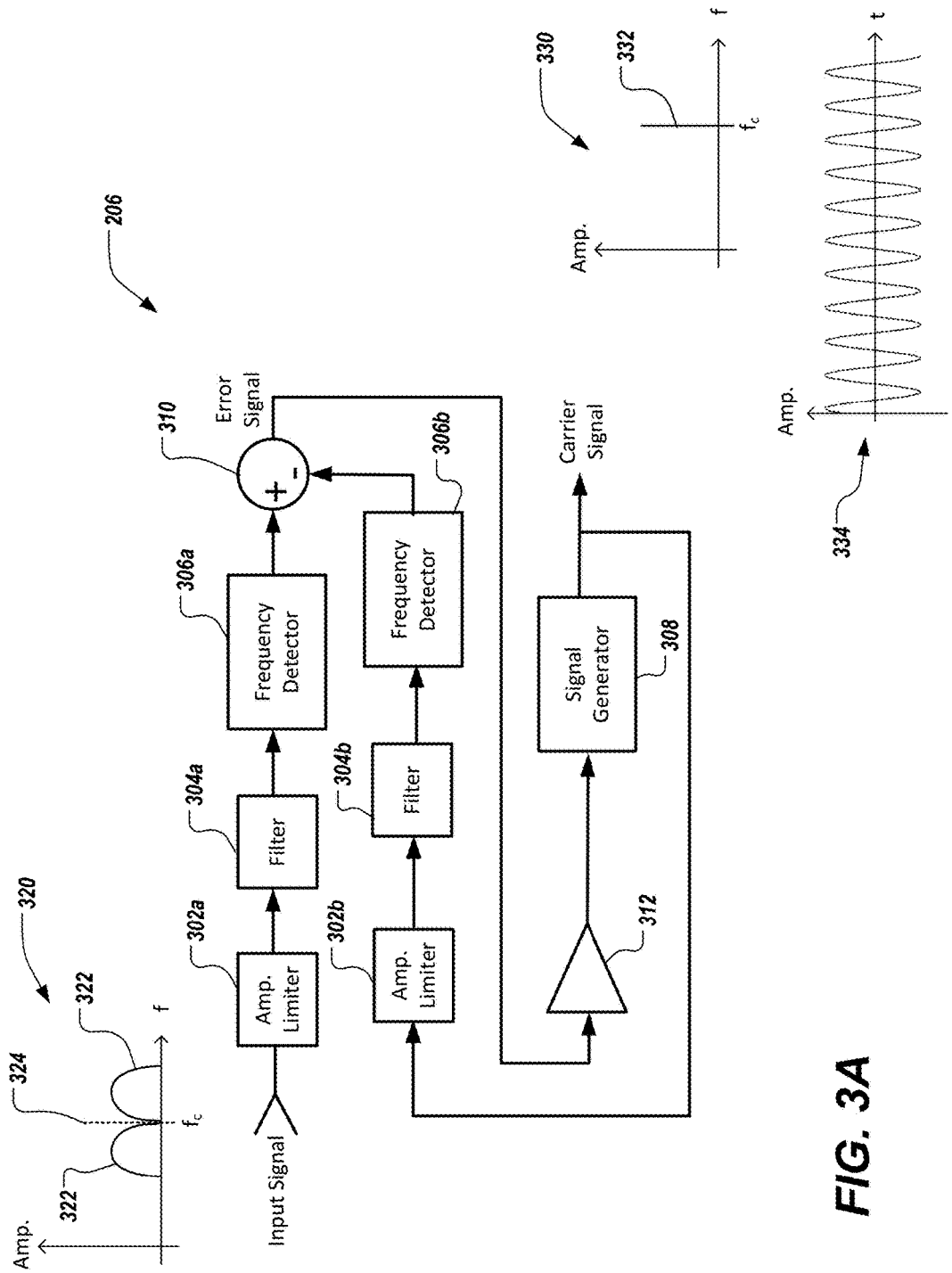
FIG. 3A depicts a block diagram of an example carrier extractor in accordance with implementations of the present disclosure.

FIG. 3A depicts a block diagram of an example CAREX 206 in accordance with implementations of the present disclosure. The CAREX 206 can be implemented as a circuit in a device such as a TM transmitter or TM receiver, for example. In some implementations, the CAREX 206 can be implemented as a standalone device for installation into in a larger system (e.g., an application specific integrated circuit (ASIC) or field programmable logic array (FPGA)). In some implementations, the CAREX 206 can be implemented in software, for example, as a set of instructions in a computing device or a digital signal processor (DSP).

The CAREX 206 operates by determining a center frequency of an input signal (e.g., either modulated or unmodulated), comparing the center frequency to the frequency of a pure sinusoidal signal produced by a signal generator to create a error signal, and adjusting the frequency of the signal generator output signal based on a control signal generated from the error signal until the error signal is minimized. Furthermore, the CAREX 206 does not require a priori information about a carrier signal to extract the carrier signal and can extract carrier signals when the carrier of the modulated signal is suppressed.

The CAREX 206 includes amplitude limiters 302a, 302b, filters 304a, 304b, frequency detectors 306a, 306b, signal generator 308, difference circuit 310, and an amplifier 312. The amplitude limiter 302a and filter 304a condition input signal before the input signal is analyzed by the first frequency detector 306a. The amplitude limiter 302a removes any variations in the amplitude of the input signal. In other words, the amplitude limiter 302a stabilizes the amplitude of the input signal. In some examples, the amplitude limiters 302a, 302b can be an analog comparator or an automatic gain control (AGC) circuit. The filters 304a, 304b are bandpass filters and removes extraneous signals (e.g., harmonics) and noise outside the channel bandwidth of the input signal.

The frequency detectors 306a and 306b can be frequency discriminators or quadrature detectors. The first frequency detector 306a detects the center frequency of the input signal. As shown in the frequency domain plot 320, an input signal produced by traditional modulation techniques generally has symmetric sidebands 322 located on either side of the carrier frequency 324. The frequency detector 306a can determine a center frequency of an input signal based on, for example, the frequencies of the outer edges of the sidebands 322. Furthermore, the frequency detector 306a can use the sidebands 322 of an input signal to determine the center frequency even if the carrier signal 324 is suppressed, as illustrated by the dotted line.

The signal generator 308 generates a pure sinusoidal signal (e.g., a single frequency signal) which is provided to a second frequency detector 306b. The signal generator 308 can be, for example, a voltage controlled oscillator (VCO) such as, but not limited to, a voltage controlled LC (inductor-capacitor) oscillator circuit, a voltage controlled crystal oscillator (VCXO), or a temperature-compensated VCXO. The second frequency detector 306b detects the frequency of the output signal from the signal generator 308. In some examples, the output signal from the signal generator 308 is provided to an amplitude limiter 302b and filter 304b before being transmitted to the second frequency detector 306b. The amplitude limiter 302b and filter 304b stabilize and filter the amplitude of the signal generator output signal similar to amplitude limiter 302a and filter 304a.

The output from each of the first and second frequency detectors 306a, 306b is provided as inputs to the differencing circuit 310. The output of both the first and second frequency detectors 306a, 306b can be, in some examples, a direct current (DC) voltage signal representing the center frequency of the input signal and the frequency of the signal generator 308 output signal, respectively. The output of the difference circuit 310 is a error signal representing the difference in frequency between the center frequency of the input signal in the signal generator output signal. The error signal (e.g., a DC voltage) is amplified by amplifier 312 and provided as a control signal to the signal generator 308. The amplifier 312 can be, for example, a high gain integrating circuit that integrates the inputted error signal over time to produce the control signal.

The signal generator 308 adjusts the frequency of its output signal based on the control signal until the frequency of the signal generator 308 output is matched to the center frequency of the input signal. The DC value of the control signal is used to control the frequency of the signal generator output, as shown in FIG. 4B and described below. The signal generator output is provided as the output of the CAREX 206. Frequency domain plot 330 and time domain plot 334 represent an example CAREX 206 output signal. As shown, the output signal of the CAREX 206 is a pure sinusoidal signal having a frequency 332 equivalent to the fundamental carrier frequency of the input signal.

In some implementations, the frequency detectors 306a and 306b are matched. In some examples, the matched frequency detectors 306a and 306b have similar frequency to DC output characteristics over changing modulated input frequencies. In some examples, the matched frequency detectors 306a and 306b have similar thermal and aging properties. In some examples, the amplitude limiters 302a and 302b, and the filters 304a and 304b are matched.

In some examples, when the error signal is minimized the signal generator output is effectively matched to the center frequency of the input signal. For example, the error signal can be considered as minimized when its magnitude is zero or substantially close to zero (e.g., when the control signal has a magnitude that is negligible in relation signal magnitudes measurable or usable by components of the CAREX 206). In some examples, the error signal is considered to be minimized when its magnitude is below a threshold value (e.g., an error tolerance threshold).

In some implementations, the CAREX 206 is adapted to extract carrier frequencies from single sideband signals. In some examples, the CAREX 206 includes a controller that offsets the output signal of the signal generator 308 by an appropriate offset frequency. For example, the output of the frequency generator 308 can be offset after it is fed back to the second frequency detector 306b, so as to not adversely affect the control signal. In some examples, the first frequency detector 306a can be configured to determine a frequency offset based on the bandwidth of the input signal. In such examples, the first frequency detector 306a can adjust the detected frequency by the frequency offset.

FIG. 3B is a block diagram of an example frequency detector 306 in accordance with implementations of the present disclosure. The frequency detector 306 illustrated in FIG. 3B is an example quadrature-based detector circuit. The frequency detector 306 includes a phase shift network 350, a signal mixer 352, and a filter 354. The phase shift network 350 is a frequency sensitive circuit, such as an all pass filter, for example, that causes a phase shift in an input signal that corresponds with the frequency of the input signal. In other words, the phase shift network 350 causes a change in the phase angle of the input signal relative to the frequency of the input signal. In some examples, the phase shift network 350 is tuned to produce a nominal phase shift of 90 degrees (e.g., quadrature to the input signal) for a nominal design frequency (e.g., a 70 MHz IF for a communication system).

The signal mixer 352 can be, for example, a signal multiplier. The signal mixer 352 receives the input signal and an output signal from the phase shift network 350 as inputs. The filter 354 is a low pass filter.

Plot 360 shows example signals at various points in the frequency detector 306. The input signal (Signal A) is passed to the phase shift network 350 and the signal mixer 352. Signal A is shown as a sinusoid for simplicity, however, Signal A can be a modulated signal. Signal B is the output of the phase shift network 350 and is phase shifted relative to the input signal (Signal A). The value of the phase shift corresponds to the frequency of Signal A, and is nominally 90 degrees for a design frequency. Deviations from the design frequency resulting in a phase shift of Signal B that deviates from the nominal 90 degrees. The input signal (Signal A) is mixed with the output of the phase shift network 350 (Signal B) to produce Signal C (e.g., Signal C=Signal A×Signal B). Signal C has a DC offset component corresponding to the phase difference between Signals A and B, and by extension, to the frequency of Signal A. The low pass filter 354 then removes the high frequency components of Signal C leaving only the DC component (Signal D). The deviation of Signal B's phase shift from the a nominal 90 degrees is exaggerated in plot 360 in order to clearly show the resulting DC output signal (Signal D).

Figure 4A:
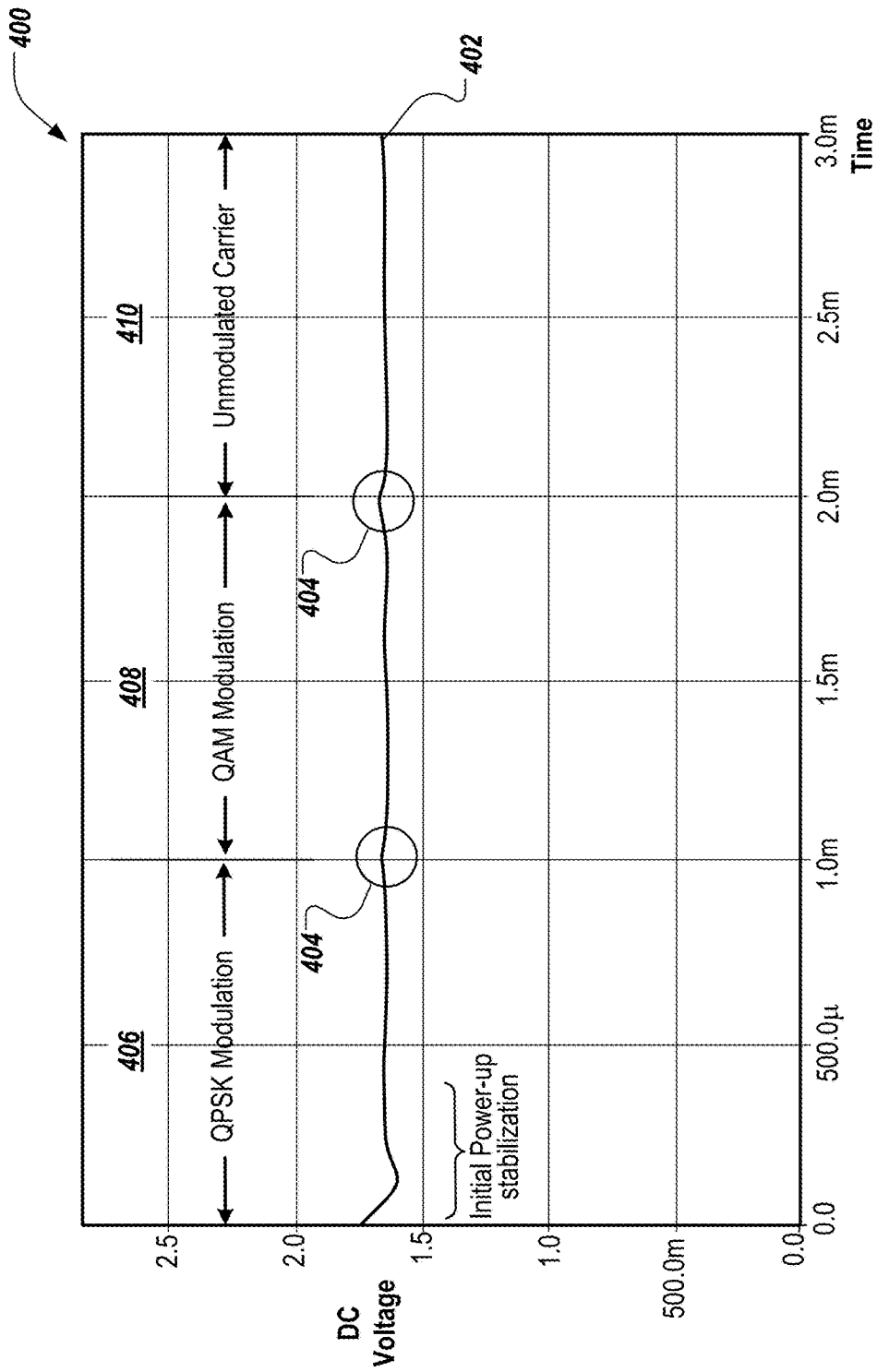
FIGS. 4A and 4B depict example control signals generated by a carrier signal extraction device.
Figure 4B:
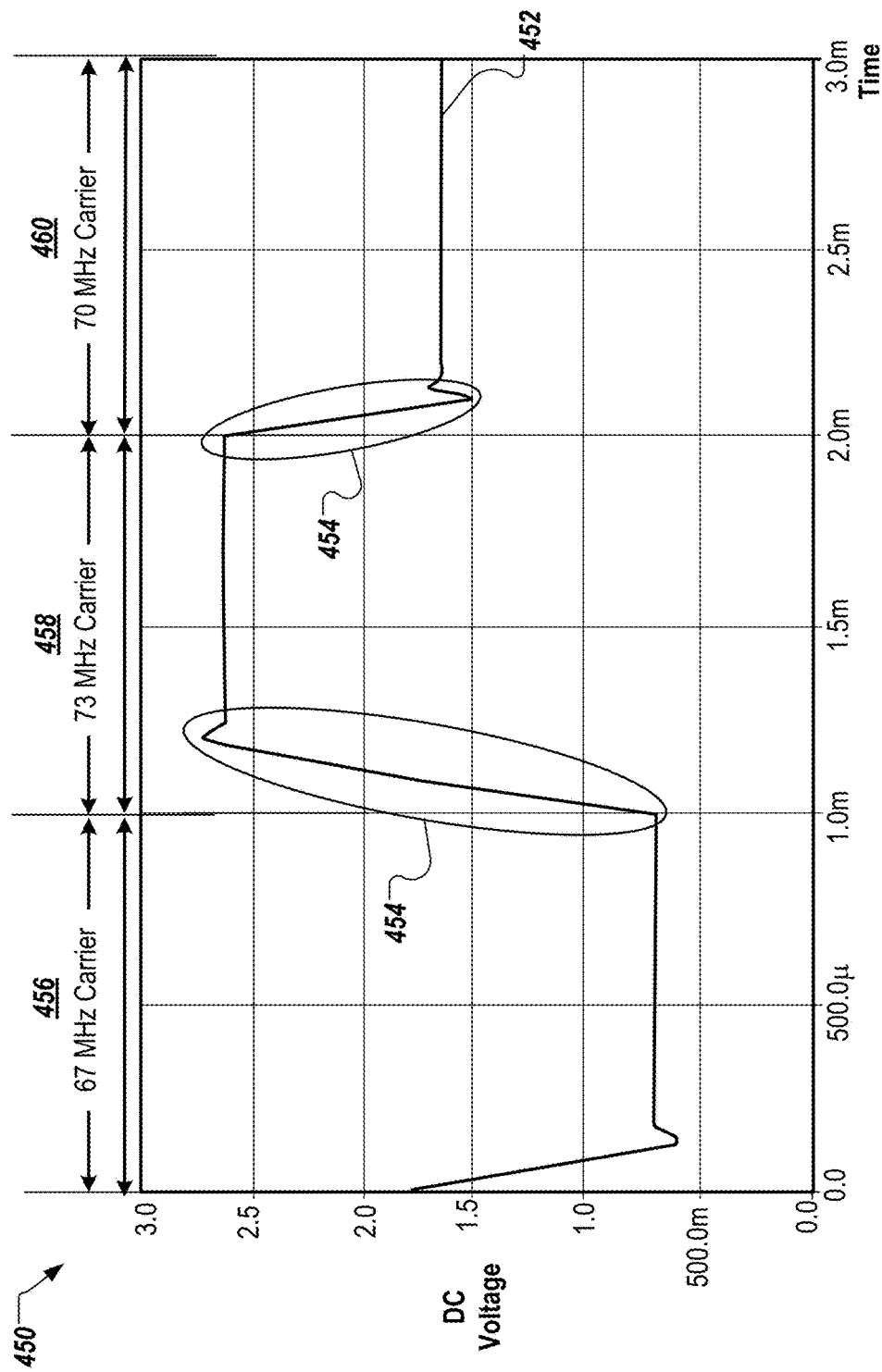

FIG. 4A depicts a plot 400 of an example control signal 402 generated in an example CAREX 206. The plotted control signal 402 is an example of the input signal to the signal generator 308 of FIG. 3A. The plotted control signal 452 is broken into several regions (406-410). The regions illustrate a variations 404 in the control signal 402 as the input signal to the CAREX 206 is switched between several different input signals, each modulated using a different type of modulation. The input signal in region 406 is a QPSK modulated signal. The input signal in region 408 is a QAM modulated signal. The input signal in region 410 is an unmodulated carrier signal. Each of the input signals in regions 406-410 is applied to a 70 MHz carrier. The plot 400 illustrates the robustness of the CAREX 206 and its adaptability to extracting carrier signals from various input signals without regard to the types of modulation applied to the carrier signal.

FIG. 4B depicts a plot 450 of another example control signal 452 generated in an example CAREX 206. The plotted control signal 452 is an example of the input signal to the signal generator 308 of FIG. 3A. The plotted control signal 452 is broken into several regions (456-460). The regions illustrate transitions 454 of the control signal 452 as the input signal to the CAREX 206 is switched between several different input signals, each having a different carrier frequency. The input signal in region 456 is a 67 MHz carrier signal. The input signal in region 458 is a 73 MHz carrier signal. The input signal in region 460 is a 70 MHz carrier signal. The plot 450 illustrates the robustness of the CAREX 206 and its adaptability to extracting different frequency carrier signals. In some implementations, as shown, the CAREX 206 loop can be designed for a specific center frequency (e.g., 70 MHz as shown). For example, the design center frequency can be a specific carrier frequency or IF of a communication system such as a satellite or radio frequency (RF) communication system, for example.

Figure 5:
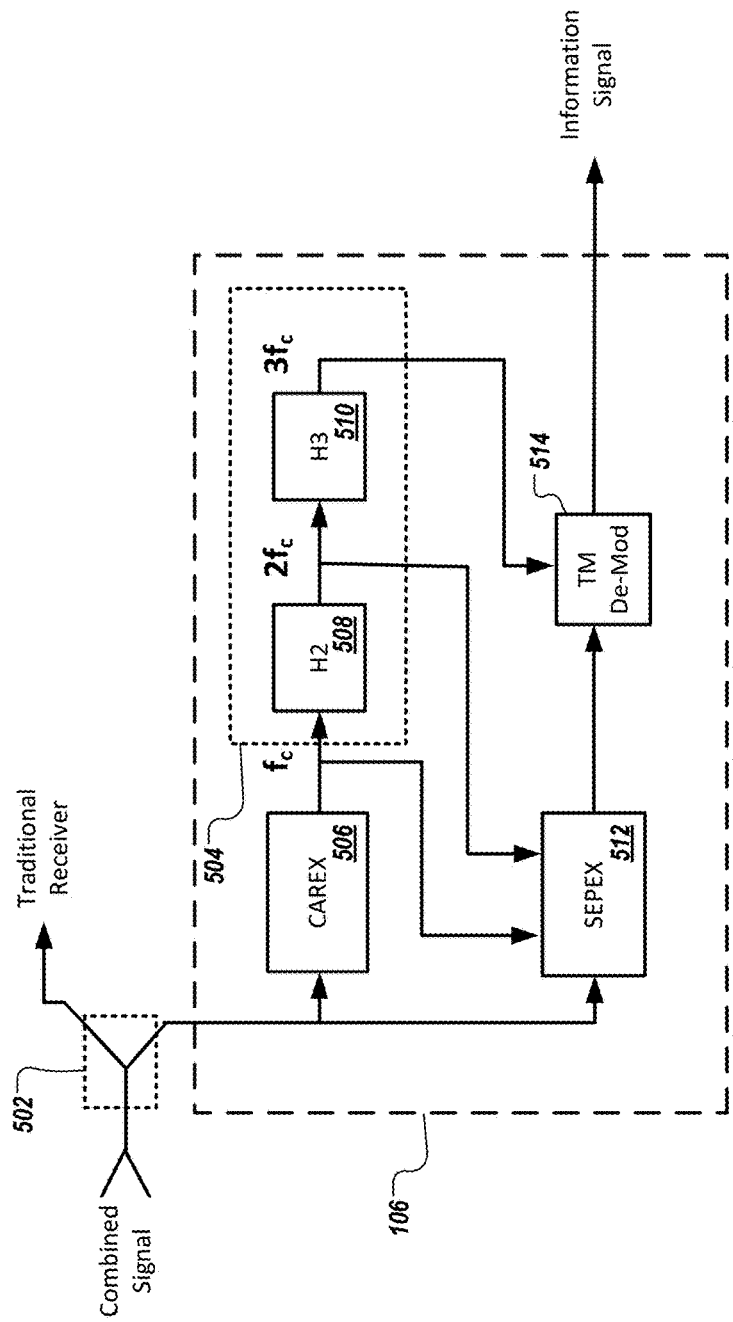
FIG. 5 depicts a block diagram of an example TM signal receiver in accordance with implementations of the present disclosure.

FIG. 5 depicts a block diagram of an example TM signal receiver 106 in accordance with implementations of the present disclosure. The TM receiver 106 includes a carrier extraction portion (e.g., CAREX 506), a harmonic generation portion 504, a signal separation and extraction portion (SEPEX) device 512, and a TM demodulator 514. As in the TM transmitter 104, the harmonic generation portion includes a second harmonic generator 508 and a third harmonic generator 510. In addition, the TM receiver 106 can include a signal splitter 502 to split a combined input signal (e.g. combined signal 112 of FIG. 1) between the TM receiver 106 and a signal receiver for traditional modulated signals.

In operation, the TM receiver 106 receives a combined input signal and provides the combined signal to both the CAREX 506 and SEPEX device 512. As described above in reference to the TM receiver 106, the CAREX 506 extracts a carrier signal ($f_c$) from the combined signal, and the second harmonic generator 508 and third harmonic generator 510, respectively, generate second and third harmonics ($2f_c$ and $3f_c$) of the extracted fundamental carrier frequency ($f_c$). Both the carrier signal ($f_c$) and second harmonic signal ($2f_c$) are provided to the SEPEX device 512. The third harmonic signal ($3f_c$) is provided to the TM demodulator 514.

The TM demodulation portion 504 separates and extracts the traditionally modulated signal from the combined signal to obtain the TM modulated signal. The SEPEX device 512 provides the TM modulated signal to the TM demodulator 514, which, demodulates the TM modulated signal to obtain a baseband data signal. The SEPEX device 512 separates and extracts the TM modulated signal from the combined signal. In some implementations, before outputting the TM modulated signal, the SEPEX device 512 heterodynes (e.g., up-shifts) the TM modulated signal to the third harmonic frequency ($3f_c$) for demodulation. The SEPEX device 512 is described in more detail below in reference to FIG. 6.

The TM demodulator 514 uses the third harmonic signal ($3f_c$) provided by the third harmonic generator 210 as a reference signal for TM demodulation. The TM demodulator 514 demodulates the TM signal by sensing the time shifts between TM modulated carrier signal from the SEPEX device 512 and the third harmonic signal ($3f_c$). In some examples, the TM demodulator 514 can be a phase detection circuit. In some implementations, the TM demodulator 514 detects the time shifts by determining a correlation between the TM modulated carrier signal and the third harmonic signal ($3f_c$) based on, for example, a product of the two signals.

Figure 6A:
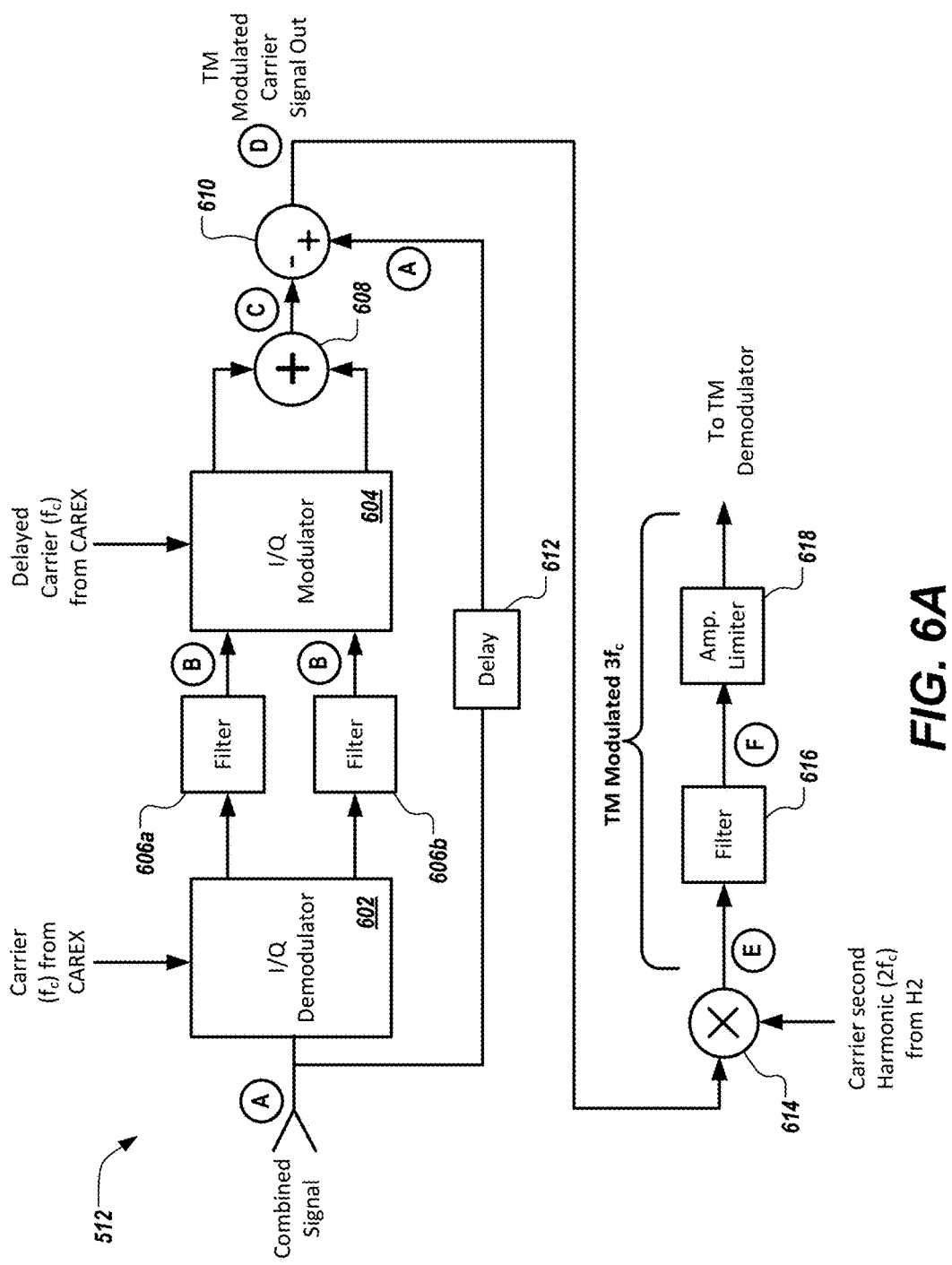
FIG. 6A depicts a block diagram of an example TM signal separation and extraction device in accordance with implementations of the present disclosure.

FIG. 6A depicts a block diagram of an example TM signal SEPEX device 512 in accordance with implementations of the present disclosure. The SEPEX device 512 can be implemented as a circuit in a device such as a TM receiver, for example. In some implementations, the SEPEX device 512 can be implemented as a standalone device for installation into in a larger system (e.g., an application specific integrated circuit (ASIC) or field programmable logic array (FPGA)). In some implementations, the SEPEX device 512 can be implemented in software, for example, as a set of instructions in a computing device or a digital signal processor (DSP).

In operation, the SEPEX device 512 demodulates the traditionally modulated signal from the combined signal. Because the TM modulation is not detected by traditional signal demodulation, the resulting signal does not include the TM signal, but only the demodulated data signal from the traditional modulation signal. A "clean" (e.g., un-modulated) carrier is then re-modulated with the previously demodulated data signal from the traditional modulation signal. The SEPEX 512 computes the difference between the combined signal and the re-modulated signal to obtain a TM modulated carrier signal. In other words, the SEPEX device 512 removes a traditionally modulated signal from the combined signal by demodulating the traditionally modulated signal, re-modulating a "clean" (e.g., un-modulated) carrier, and subtracting the re-modulated signal from the combined signal, thereby, leaving only the TM modulated carrier.

The SEPEX device 512 includes a signal demodulator 602, a signal modulator 604, low-pass filters 606a, 606b, a summing circuit 608, a difference circuit 610, a delay circuit 612, a mixer 614, a bandpass filter 616, and an amplitude limiter 618. The demodulator 602 is a non-TM signal demodulator, and the modulator 604 is a non-TM signal modulator. That is, the demodulator 602 and modulator 604 are traditional modulation type (e.g., AM, FM, PM, QAM, APSK, etc.) demodulator and modulator. The demodulator 602 and modulator 604 are depicted as a complex (e.g., quadrature and in-phase) demodulator and modulator, however, in some examples the demodulator 602 and modulator 604 can be a simple (e.g., single phase) demodulator and modulator.

Figure 6B:
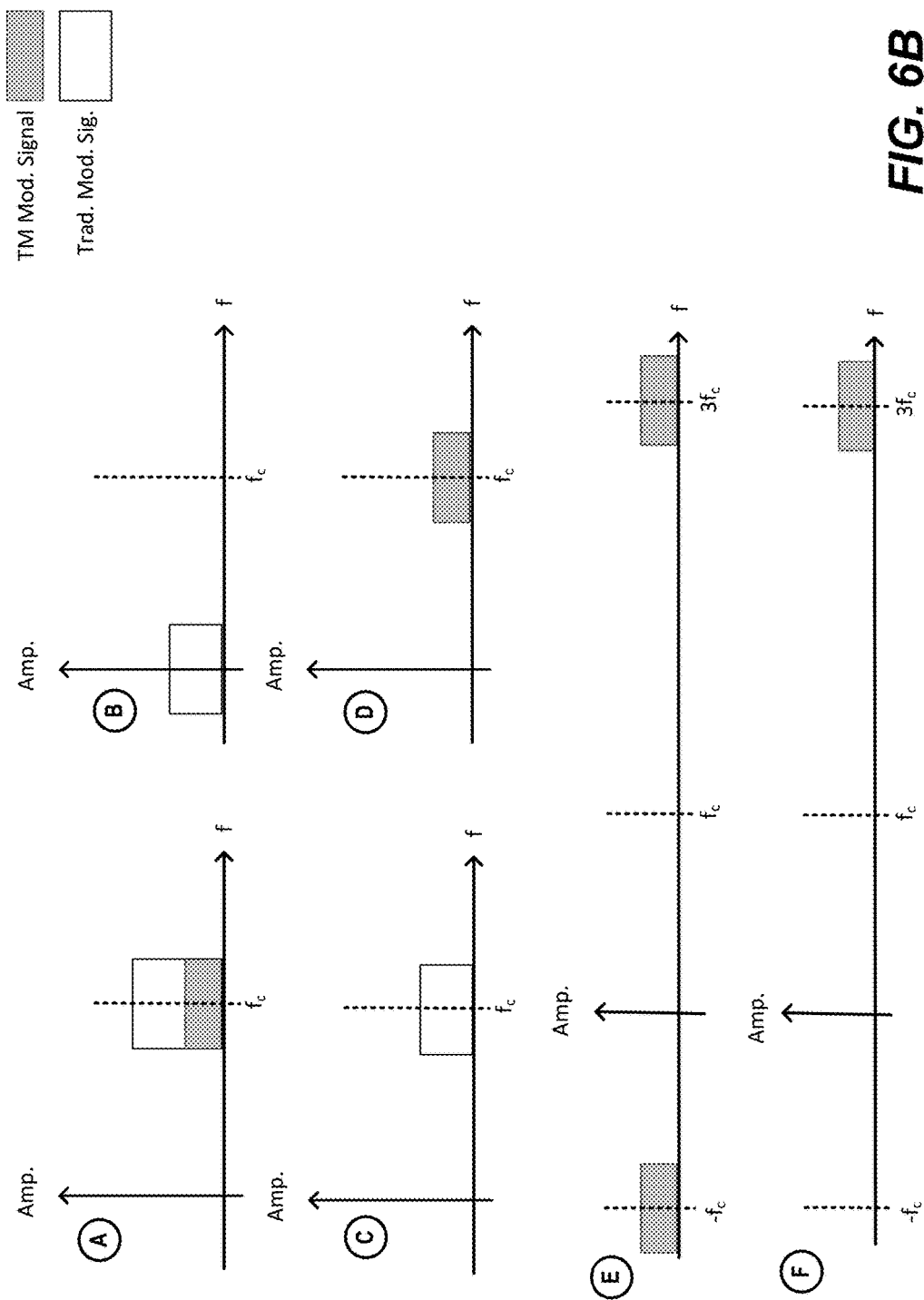
FIG. 6B depicts frequency domain representations of signals at various stages of the TM signal separation and extraction device shown in FIG. 6.

The operation the SEPEX device 512 is described below in more detail and with reference to FIGS. 6A and 6B. FIG. 6B depicts frequency domain representations of signals (A-F) at various stages of the SEPEX device 512. The demodulator 602 receives the combined signal (A) (e.g. combined signal 112 of FIG. 1) as one input, and the carrier signal ($f_c$) from the CAREX 506 as a second input. The combined signal includes both a traditionally modulated signal and a TM modulated signal. As shown by signal (A) in FIG. 6B, the combined signal includes frequency content from both the TM modulated signal and the traditionally modulated signal centered about the carrier frequency ($f_c$). The demodulator 602 demodulates the traditional modulated signal from the combined signal producing a baseband data signal. As noted above, because the TM modulation is not detected by traditional signal demodulation, the resulting baseband data signal does not include a TM signal.

In the case of complex modulation, the demodulator 602 demodulates both the in-phase and quadrature phase of the combined signal producing an in-phase and a quadrature phase baseband data signal. The low-pass filters 606a and 606b remove any extraneous signals or noise from the baseband data signals, for example, harmonics introduced by the demodulation process. The resulting baseband data signal, shown by signal (B), includes only the frequency content from the traditionally modulated signal centered at zero frequency (baseband). More specifically, a TM modulated signal does not exist at baseband, and thus, the TM modulated signal is removed by converting the traditionally modulated signal to baseband.

The modulator 604 receives the baseband data signals (e.g., in-phase and quadrature phase signals) as a first input, and the carrier signal ($f_c$) from the CAREX 506 as a second input. The modulator 604 re-modulates the un-modulated carrier signal ($f_c$) from the CAREX 506 with the baseband data signals resulting in re-modulated carriers (re-modulated in-phase and quadrature phase carriers) having only the traditionally modulated signal. The in-phase and quadrature phase re-modulated carriers are combined by the summing circuit 608 (signal (C)). FIG. 6B signal (C) shows the re-modulated signal again centered about the carrier frequency ($f_c$). In some examples, the carrier signal ($f_c$) may be phase shifted or delayed to account for delays introduced into the baseband data signals during the demodulation and filtering process. This is to ensure that the resulting re-modulated signal is in phase with the combined signal.

The re-modulated signal is subtracted from the combined signal by the difference circuit 610 removing the traditionally modulated signal from the combined signal. The resulting signal, show by signal (D), includes only the TM modulated carrier signal ($f_c$). The combined signal is delayed by the delay circuit 612 to account for delays introduced into the re-modulated signal by the demodulation and re-modulation process.

The TM modulated signal is heterodyned (e.g., up-shifted) to the third harmonic ($3f_c$) by the mixer 614. The mixer 614 multiplies the TM modulated signal with the second harmonic ($2f_c$) of the carrier from the second harmonic generator 508 producing signal (E). Heterodyning the TM modulated carrier signal ($f_c$) with the second harmonic ($2f_c$) shifts the TM modulated signal to both the third harmonic ($3f_c$) and the negative carrier frequency ($-f_c$) (e.g., a phase inverted version of the TM modulated signal at the carrier frequency). The bandpass filter 616 removes the phase inverted TM signal at the carrier frequency leaving only the TM modulated third harmonic ($3f_c$) (signal (F)), and the optional amplitude limiter 618 removes any variations in the amplitude of the TM modulated third harmonic signal.

In some examples, the SEPEX device 512 can include multiple different types of demodulators 602 and modulators 604. For example, the SEPEX device 512 can include FM, PM, and QAM demodulators 602 and modulators 604. In such examples, the SEPEX device 512 can also include a control device that detects the type of traditional modulation on input signal, and sends the input signal to the appropriate set of demodulator and modulator.

Although the SEPEX device 512 is described in the context of separating and extracting a TM modulated signal from a traditionally modulated signal, in some implementations, the SEPEX device 512 can be modified to separate two traditionally modulated signals such as separating non-quadrature modulated signals (e.g., in-phase modulated signal) and quadrature modulated signals. For example, a non-quadrature modulated signal could be separated and extracted from a combined I/Q modulated signal by modifying the SEPEX device 512 shown in FIG. 6A such that only the quadrature modulated signal is demodulated and demodulated by demodulator 602 and modulator 604.

FIG. 7 depicts an example process 700 for identifying TM capable devices that can be executed in accordance with implementations of the present disclosure. In some examples, the example process 700 can be provided as computer-executable instructions executed using one or more processing devices (e.g., a digital signal processor) or computing devices. In some examples, the process 700 may be hardwired electrical circuitry, for example, as an ASIC or an FPGA device. In some examples, the process 700 may be executed by a software defined radio (SDR).

A signal that includes a carrier signal modulated with a transposition modulation (TM) signal is transmitted (702). For example, the signal can be transmitted by an electronic device in a query or discovery request to determine whether devices within range of the signal have TM capabilities. In some implementations, the transmitted signal can include a non-TM signal on the same carrier signal as the TM signal.

A response to the transmitted signal is received (704). For example, a second device may receive the transmitted signal and send a response signal. If the second device has TM receiving and transmitting capabilities, the second device can send a response that includes a carrier signal modulated with a TM signal. If the second device does not have TM receiving and transmitting capabilities, the second device will not be able to detect the TM portion of the transmitted signal. Consequently, a non-TM capable second device can only respond to a non-TM portion of the transmitted signal.

It is determined whether the response signal includes a TM signal (706). For example, upon receiving the response, the transmitting device can analyze the response to determine whether it includes a TM signal. That is, the transmitting device can analyze the response signal to determine if the carrier includes any TM modulation. If the response includes TM modulation the transmitting device can determine that the second device has TM capabilities. If the response does not include TM modulation, the transmitting device can determine that the second device does not have TM capabilities.

In some implementations, the response can include information about the second device. For example, the second device can include information about the device in a TM portion of a response signal. The information can include, but is not limited to, characteristics of the second device such as identifying information, location information for the device, routing tables, identifying information for other TM capable devices in communication with the second device, network channel characteristics (e.g., noise, bandwidth), etc.

In some implementations, TM modulation can be detected in a signal by mixing a received signal with a second harmonic of the carrier signal. As discussed above in reference to FIGS. 5, 6A, and 6B, mixing the received signal with a second harmonic of its carrier signal will shifts the received signal to both the third harmonic ($3f_c$) and the negative carrier frequency ($-f_c$) (e.g., a phase inverted version of the received signal at the carrier frequency) in the frequency domain. This mixed signal can be filtered to remove the phase inverted version that is at the carrier frequency. Any TM modulation in the received signal can be detected by comparing the filtered mixed signal to an unmodulated third harmonic of the carrier signal. The TM modulation can be detected by detecting time shifts in the filtered mixed signal compared with the unmodulated third harmonic of the carrier. For example, if time shifts are not detected, then there is likely no TM modulation. If time shifts are detected, then the received signal includes TM modulation and the filtered mixed signal can be sent to a TM demodulator (e.g., TM demodulator 514 of FIG. 5) to be demodulated. In some implementations, for example when a signal includes a non-TM signal, a separation and extraction (SEPEX) process (such as that described above in reference to FIGS. 6A and 6B and below in reference to FIG. 10) can be performed on the signal to remove the non-TM signal.

FIG. 8 depicts an example process 800 for providing device identification data that can be executed in accordance with implementations of the present disclosure. In some examples, the example process 800 can be provided as computer-executable instructions executed using one or more processing devices (e.g., a digital signal processor) or computing devices. In some examples, the process 800 may be hardwired electrical circuitry, for example, as an ASIC or an FPGA device. In some examples, the process 800 may be executed by an SDR.

A transmission signal that includes a carrier signal modulated with a first transposition modulation (TM) signal is received (802). For example, the transmission signal can be transmitted by an electronic device in a query or discovery request to determine whether a device that receives the transmission signal ("receiving device") has TM capabilities. In some implementations, the transmitted signal can include a non-TM signal on the same carrier signal as the TM signal.

The first TM signal is identified within the transmission signal (804). For example, upon receiving the transmission signal, the receiving device can analyze the transmission signal to determine whether it includes a TM signal. That is, the receiving device can analyze the transmission signal to determine if the carrier includes any TM modulation. For example, the receiving device can detect and demodulate a TM signal using the processes described above in reference to FIGS. 5-7. In some implementations, for example when a transmission signal includes a non-TM signal, a separation and extraction (SEPEX) process (such as that described above in reference to FIGS. 6A and 6B and below in reference to FIG. 10) can be performed on the signal to remove the non-TM signal.

A response signal that includes information encoded within a second TM signal is sent (806). For example, if the receiving device is TM capable, the receiving device can send information back to a device that sent the transmission signal within the TM signal included in a response to the transmission signal. The information can include, but is not limited to, characteristics of the receiving device such as identifying information, location information for the device, routing tables, identifying information for other TM capable devices in communication with the receiving device, network channel characteristics (e.g., noise, bandwidth), etc.

Figure 9:
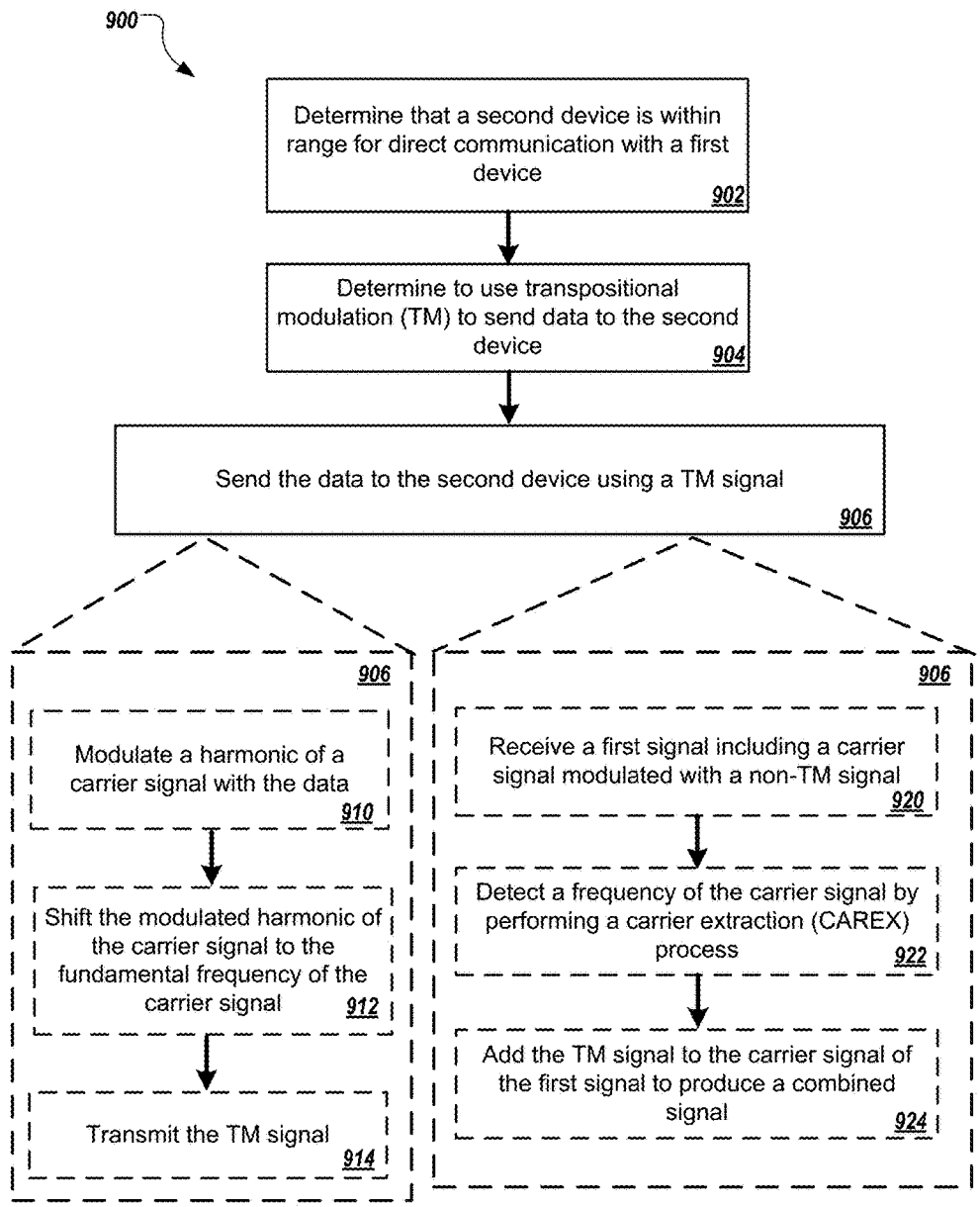

FIG. 9 depicts an example process 900 for communications between transpositional modulation (TM) capable devices that can be executed in accordance with implementations of the present disclosure. In some examples, the example process 900 can be provided as computer-executable instructions executed using one or more processing devices (e.g., a digital signal processor) or communication devices (e.g., base station 132 or mobile devices 134, 136 of FIG. 1B). In some examples, the process 900 may be hardwired electrical circuitry, for example, as an ASIC or an FPGA device. In some examples, the process 900 may be executed by an SDR.

A first device determines that a second device is within range for direct communications with the first device (902). For example, a first communication device can determine that a second communication device is within range for direct wireless communications. For example, a cellular base station can determine that a mobile device (e.g., smartphone, tablet computer, etc.) is within range for direct communications. As another example, one mobile device can determine that another mobile device is within range for direct communications. In some examples, the first device can determine that the second device is within range for direct communications based on a received signal strength from the second device, a response to a query signal (e.g., a TM query signal), or location data (e.g., GPS data) associated with the second device.

The first device determines whether to use TM to send data to the second device (904). For example, the first device can determine whether the second device is capable of performing communications using TM by, for example, performing a process such as process 700 described above. The first device can, for example, use TM signals to communicate with the second device to alleviate network traffic using non-TM signals within a communication channel used by the first device. In some examples, the first device determines to use TM based on one or more criteria. For example, the first device can determine to use TM based on one or more criteria such as an amount of data traffic using non-TM signals, a type of data to be transmitted, and/or an amount of data to be transmitted. For example, if data traffic is above a threshold value in the communication channel used by the first device, the first device can send the data to the second device using TM. Similarly, for example, the communication devices can transmit particular types of data using TM signals (e.g., real-time data).

The first device sends the data to the second device using a TM signal (906). For example, the first device can perform the following steps 910-914, the steps 920-924, or a combination of the two sets of steps to send the data using a TM signal.

In some implementations, a TM signal can be sent to the second device by modulating a harmonic of a carrier signal (e.g., a third harmonic) with the data (910). For example, the harmonic of the carrier signal can be modulated with data transposing or time shifting the third harmonic to represent data from the data signal (e.g., data bits or symbols), as described above in reference to FIG. 2. The modulated harmonic is heterodyned to the frequency of the carrier signal. For example, the modulated harmonic of the carrier is shifted (e.g., heterodyned) to the fundamental frequency of the carrier signal (912) to produce the TM signal. For example, the modulated harmonic can be shifted to the fundamental frequency of the carrier signal by mixing it with another appropriate harmonic (e.g., a second harmonic) of the carrier signal. The TM signal is transmitted to the second device (914).

In some implementations, a first signal including a carrier signal modulated with a non-TM signal is received by the first device (920). For example, the first signal can be an existing signal received from a third communication device such as, for example, a non-TM cellular communication signal, a broadcast signal, or a signal in the ISM frequency band. For example, a broadcast signal can be an AM or FM radio signal, a broadcast or cable cast televisions signal, a satellite communication signal (e.g., a satellite television signal, a GPS signal). In some examples, the first signal is received by a communication device that includes both traditional and TM receivers and transmitters.

A frequency of the carrier signal is detected by performing a carrier extraction process (CAREX) on the first signal (922). For example, a CAREX process such as that described in reference to FIGS. 3A-4B and 10 can be performed on the first signal to extract the frequency of the carrier signal from the first signal.

The TM signal (including the data for the second device) is added to the carrier signal of the first signal to produce a combined signal (924), and the combined signal is transmitted to the second device. The combined signal may be received by various different receivers, but only TM capable receivers will be able to detect that the TM signal is present in the combined signal.

In some implementations, a TM signal is added to a carrier signal by modulating a harmonic of a carrier signal (e.g., a third harmonic) with the data (910). For example, the harmonic of the carrier signal can be modulated with data by transposing or time shifting the third harmonic to represent data from the data signal (e.g., data bits or symbols), as described above in reference to FIG. 2. The modulated harmonic is heterodyned to the frequency of the carrier signal. For example, the modulated harmonic of the carrier is shifted (e.g., heterodyned) to the fundamental frequency of the carrier signal (912) to produce the TM signal. For example, the modulated harmonic can be shifted to the fundamental frequency of the carrier signal by mixing it with another appropriate harmonic (e.g., a second harmonic) of the carrier signal. The TM signal is transmitted to the second device (914).

In some implementations, the phase of the first signal and the TM signal are synchronized before generating the combined signal. For example, the phase of the TM modulated signal can be synchronized with that of a received non-TM signal before combining the two signals and transmitting the combined signal. In some examples, the phase of the carrier of the TM signal can be phase matched with the carrier signal of the non-TM signal before the two signals are combined.

In some implementations, analog data (e.g., DC signals) can be prioritized for transmission using TM signals. For example, TM signals may provide a better response to DC data signals than other non-TM modulation methods. Specifically, non-TM modulation receivers may rely on consistently shifting values to detect and demodulate signals. However, in some examples, a TM signal can be used to encode a DC signal as a constant shift in a harmonic of a carrier signal that can be continuously detected by a receiver and interpreted as an appropriate DC value.

Figure 10:
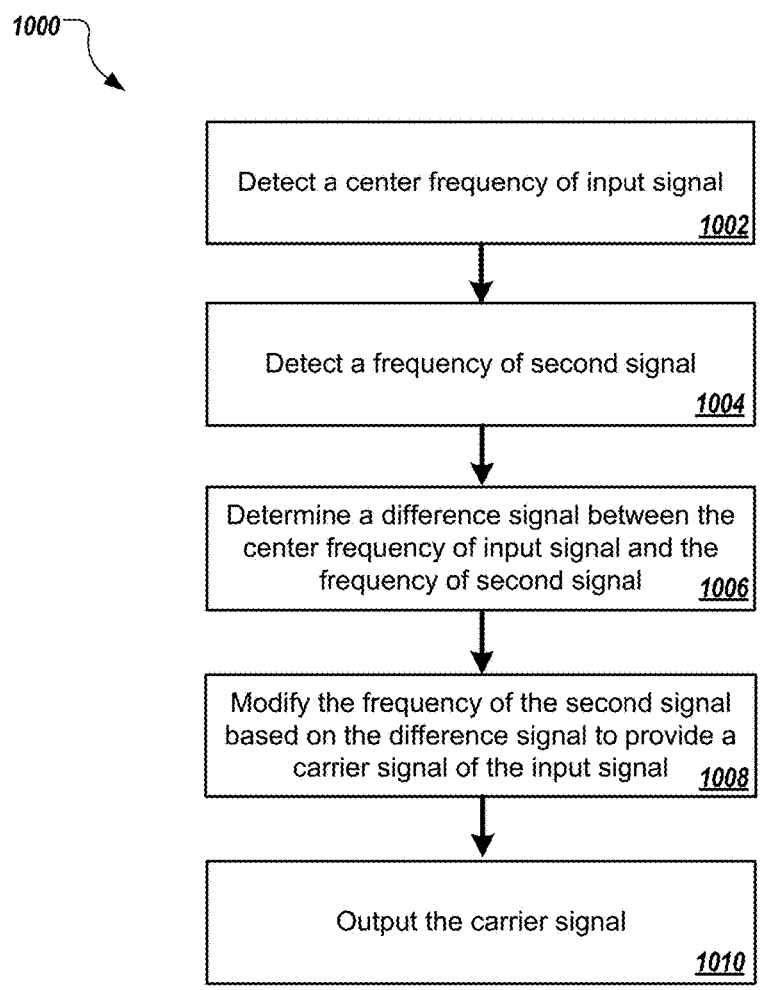

FIG. 10 depicts an example process 1000 for extracting a carrier frequency from an input signal that can be executed in accordance with implementations of the present disclosure. In some examples, the example process 1000 can be provided as computer-executable instructions executed using one or more processing devices (e.g., a digital signal processor) or computing devices. In some examples, the process 1000 may be hardwired electrical circuitry, for example, as an ASIC or an FPGA device. In some examples, the process 1000 may be executed by an SDR.

A center frequency of an input signal is detected (1002). For example, the center frequency can be detected based on frequency side lobes of the input signal. In some examples, the input signal can include the carrier signal modulated with the modulation signal. In some examples, the input signal is a carrier signal modulated with a traditional modulation signal and a TM modulation signal. A frequency of a second signal is detected (1004). For example, the second signal may be the output of a signal generator such as, for example, a VCO or a VCXO. A difference signal (e.g., control signal) is determined based on the center frequency of the input signal and the frequency of the second signal (1006). For example, the difference signal represents a difference in frequency between the center frequency of the input signal and the frequency of the second signal. In some examples, difference signal is a DC voltage signal.

The frequency of the second signal is modified based on the difference signal to provide the carrier signal of the input signal (1008), and the second signal is outputted as the carrier signal from the device performing the process 1000 (1010). For example, a difference signal can be a control signal for the signal generator and can cause the signal generator to adjust the frequency of its output signal. The frequency of the second signal modified until it is matched to the center frequency of the input signal. In some examples, the frequency of the second signal is matched to the center frequency of the input signal when the difference signal reaches a minimum value. In some examples, the minimum value may be a threshold value indicating that the difference between the frequency of the second signal in the center frequency of input signal is within an allowable tolerance. In some examples, the minimum value may be a magnitude of the different signal voltage that is below the threshold minimum voltage magnitude.

Figure 11:
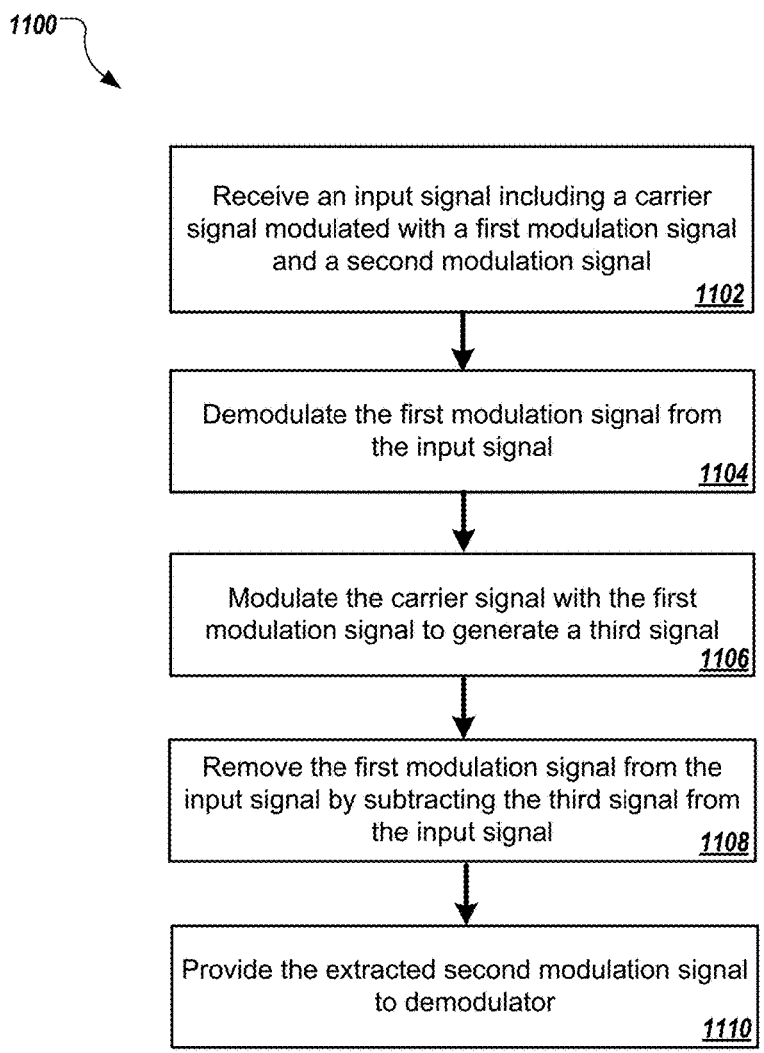

FIG. 11 depicts an example process 1100 for separating TM signals from input signals that can be executed in accordance with implementations of the present disclosure. In some examples, the example process 1100 can be provided as computer-executable instructions executed using one or more processing devices (e.g., a digital signal processor) or computing devices. In some examples, the process 1100 may be hardwired electrical circuitry, for example, as an ASIC or an FPGA device. In some examples, the process 1100 may be executed by an SDR.

An input signal including a carrier signal modulated with a first modulation signal and a second modulation signal is received (1102). For example, the first modulation signal may be a traditional type of modulation signal such as, for example, FM, AM, PM, QAM, APSK, etc. The second modulation signal may be a TM modulation signal. The first modulation signal is demodulated from the input signal (1104). For example, the first modulation signal can be demodulated using traditional the modulation techniques. Because traditional demodulation techniques do not recognize TM modulation, the resulting demodulated first modulation signal will not include the TM modulation signal.

The carrier signal is re-modulated using the demodulated first modulation signal to generate a third signal (1106). For example, the third signal includes an un-modulated carrier signal modulated with the first modulation signal. The un-modulated carrier signal has the same frequency as the carrier of the input signal. The first modulation signal is removed from the input signal by subtracting the third signal from the input signal (1108) to extract the second modulation signal (e.g., the TM modulation signal) from the input signal. In some examples, the input signal must be delayed an appropriate amount of time to ensure that it is in phase with the third signal. That is, due to the demodulation and re-modulation process the third signal may be out of phase with the original input signal. Thus, before subtracting the third signal from the input signal, the input signal can be delayed an appropriate amount of time. The extracted second modulation signal is provided to a signal demodulator (1110). For example, an extracted TM modulated signal can be provided to a TM signal demodulator for demodulation.

While the present disclosure is generally directed to generating transpostional modulated signals and demodulating transpostional modulated signals using a third harmonic of a carrier signal, in some implementations transpostional modulated signals can be generated and demodulated by using other harmonics of a carrier signal (e.g., a fourth harmonic, fifth harmonic, sixth harmonic, etc.).

Implementations of the subject matter and the operations described in this specification can be realized in analog or digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal; a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any implementation of the present disclosure or of what can be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A mobile device comprising:
one or more processors;
a transpositional modulation (TM) transmitter coupled to the one or more processors;
a TM receiver coupled to the one or more processors; and
a data store coupled to the one or more processors having instructions stored thereon which, when executed by the one or more processors, causes the one or more processors to perform operations comprising:
receiving, from a base station, an query signal requesting whether the mobile device is capable of performing TM communications;
sending, to the base station and in response to the query signal, a response signal indicating that the mobile device is capable of performing TM communications; and
conducting electronic communications, using TM signals, with the base station.

2. The device of claim 1, wherein the response signal includes a TM signal.

3. The device of claim 1, wherein the query signal includes a TM signal.

4. The device of claim 1, wherein the operations further comprise conducting electronic communications with the base station using TM signals and non-TM signals.

5. The device of claim 1, wherein conducting electronic communications, using TM signals, with the base station comprises:
sending a first type of data to the base station using TM signals; and
sending a second type of data to the base station using non-TM signals.

6. The device of claim 1, wherein conducting electronic communications, using TM signals, with the base station comprises determining, based on an amount of data to be sent, to use TM signals to communicate the data to the base station.

7. The device of claim 1, wherein the response signal includes information about the mobile device.

8. The device of claim 1, wherein the operations further comprise:
identifying a second mobile device that is within range for direct communications and that the second mobile device is capable of performing TM communications; and
conducting electronic communications, using TM signals, with the base station.

9. The device of claim 8, wherein the response signal includes information about the second mobile device.

10. A mobile device comprising:
a transpositional modulation (TM) transmitter; and
a TM receiver, and
wherein the mobile device is configured to perform operations comprising:
receiving, from a base station, an query signal requesting whether the mobile device is capable of performing TM communications;
sending, to the base station and in response to the query signal, a response signal indicating that the mobile device is capable of performing TM communications; and
conducting electronic communications, using TM signals, with the base station.

11. The device of claim 10, wherein the response signal includes a TM signal.

12. The device of claim 10, wherein the query signal includes a TM signal.

13. The device of claim 10, wherein the operations further comprise conducting electronic communications with the base station using TM signals and non-TM signals.

14. The device of claim 10, wherein conducting electronic communications, using TM signals, with the base station comprises:
sending a first type of data to the base station using TM signals; and
sending a second type of data to the base station using non-TM signals.

15. The device of claim 10, wherein conducting electronic communications, using TM signals, with the base station comprises determining, based on an amount of data to be sent, to use TM signals to communicate the data to the base station.

16. The device of claim 10, wherein the response signal includes information about the mobile device.

17. The device of claim 10, wherein the operations further comprise:
identifying a second mobile device that is within range for direct communications and that the second mobile device is capable of performing TM communications; and
conducting electronic communications, using TM signals, with the base station.

18. The device of claim 17, wherein the response signal includes information about the second mobile device.

* * * * *